(12) United States Patent
Tan et al.

(10) Patent No.: US 9,191,244 B2
(45) Date of Patent: Nov. 17, 2015

(54) EQUALIZER AND SEMICONDUCTOR DEVICE

(71) Applicant: RENESAS ELECTRONICS CORPORATION, Kanagawa (JP)

(72) Inventors: Kenzo Tan, Kanagawa (JP); Masahiro Takeuchi, Kanagawa (JP)

(73) Assignee: RENESAS ELECTRONICS CORPORATION, Kanagawa (JP)

( * ) Notice: Subject to any disclaimer, the term of this patent is extended or adjusted under 35 U.S.C. 154(b) by 3 days.

(21) Appl. No.: 14/133,049

(22) Filed: Dec. 18, 2013

(65) Prior Publication Data
US 2014/0177699 A1 Jun. 26, 2014

(30) Foreign Application Priority Data

Dec. 25, 2012 (JP) .................. 2012-280517
Oct. 15, 2013 (JP) .................. 2013-214514

(51) Int. Cl.
*H04Q 1/20* (2006.01)
*H03H 7/30* (2006.01)
*H03H 7/40* (2006.01)
*H04L 25/03* (2006.01)

(52) U.S. Cl.
CPC .... *H04L 25/03057* (2013.01); *H04L 25/03343* (2013.01); *H04L 2025/03808* (2013.01)

(58) Field of Classification Search
CPC ................ H04L 25/03057; H04L 25/03343; H04L 2025/03808
USPC .......................................... 375/232
See application file for complete search history.

(56) References Cited

U.S. PATENT DOCUMENTS

2012/0057627 A1* 3/2012 Chan et al. .................... 375/233
2012/0207202 A1* 8/2012 Hidaka ......................... 375/233

FOREIGN PATENT DOCUMENTS

JP          2012-170079 A     9/2012

OTHER PUBLICATIONS

Ren et al., "Precursor ISI Reduction in High-Speed I/O", 2007 Symposium on VLSI Circuits Digest of Technical Papers, p. 134-135.

* cited by examiner

*Primary Examiner* — Tanmay Shah
(74) *Attorney, Agent, or Firm* — Mattingly & Malur, PC

(57) ABSTRACT

An equalizer includes a first discrimination circuit to receive an input signal corresponding to a signal output from a transmit-side equalizer to binarize the input signal by a first threshold value in unit time, a second discrimination circuit to binarize the input signal by a second threshold value in unit time, a first delay circuit to delay an output signal of the first discrimination circuit and that includes N-number (N>=2) of stages of unit delay circuits connected in cascade and operating in unit time, a second delay circuit to receives an output signal of the second discrimination circuit and that includes not less than an (N+1)-number of stages of unit delay circuits connected in cascade and operating in unit time, and a control unit that receives an output of the first delay circuit, and a second output signal output from the second delay circuit.

15 Claims, 20 Drawing Sheets

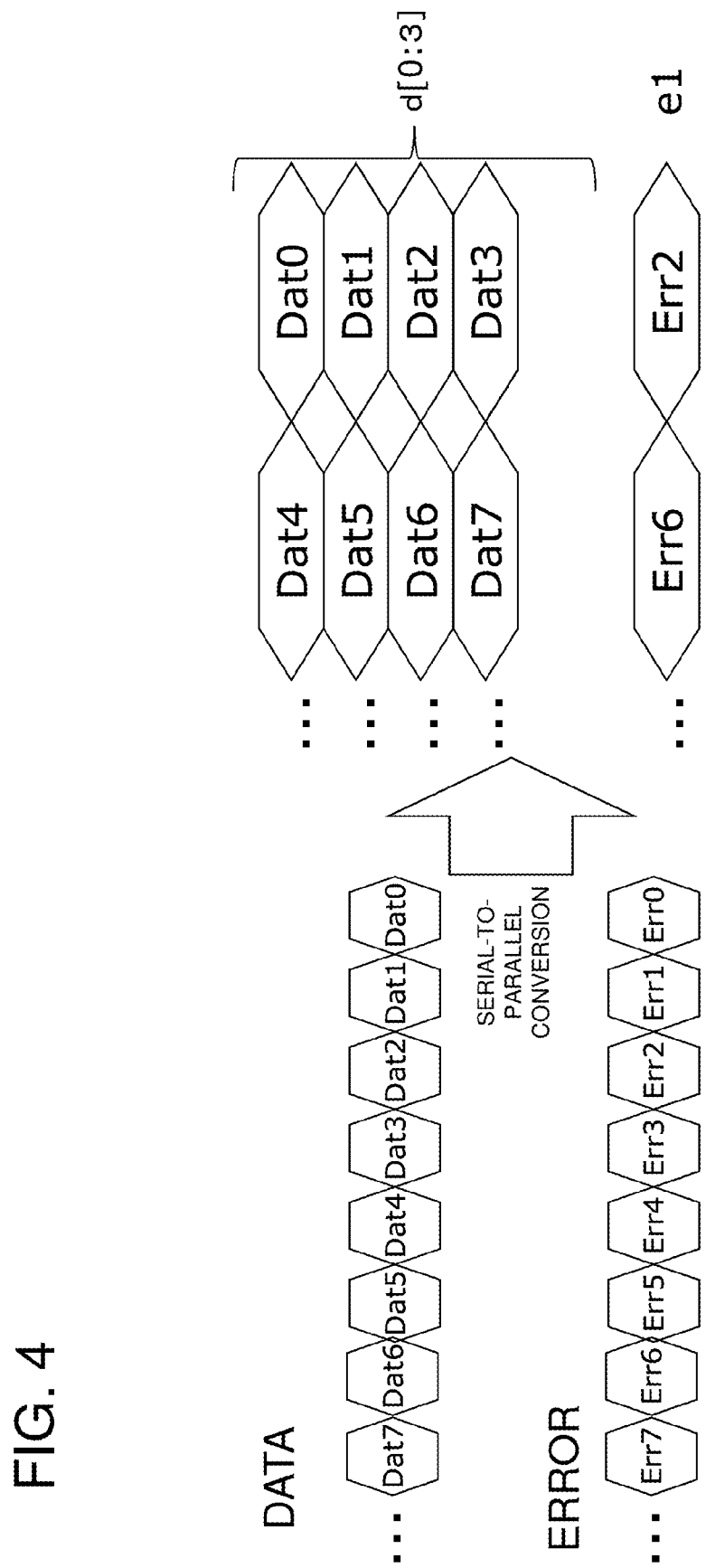

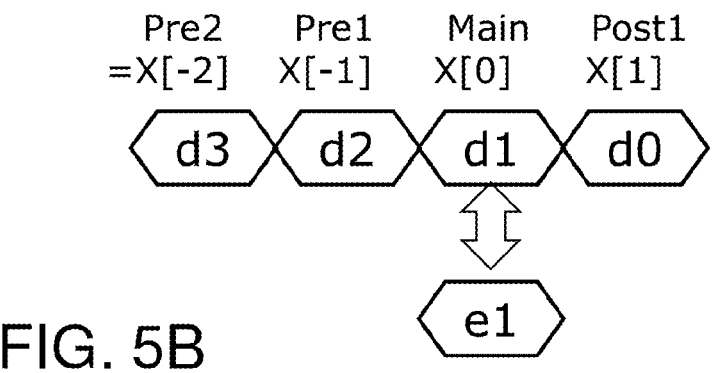

```
           Pre2    Pre1    Main    Post1
          =X[-2]   X[-1]   X[0]    X[1]
```

WHN THE SIGN OF THE ERROR SAMPLER
THRESHOLD VALUE IS (+)
EQUATION FOR CALCULATING SS-LMS $\Delta X[-2:1] = e[1] \cdot d[3:0]$   ··· EQUATION(1-1)

$\Rightarrow X[k]_n = X[k]_{n-1} + \Delta X[k] \cdot$ Step   ··· EQUATION(1-2)

e[k], d[k]: ASSUME BINARY VALUE OF +1 or -1
Step: X COEFFICIENT RESOLUTION

PROVIDED THAT, IN THE EXEMPLARY EMBODIMENT,
STEP = 1 AND X[-2] IS NOT SENT TO TRANSMIT
SIDE. X[-1] IS MODIFIED BY $\Delta X[-2]$.

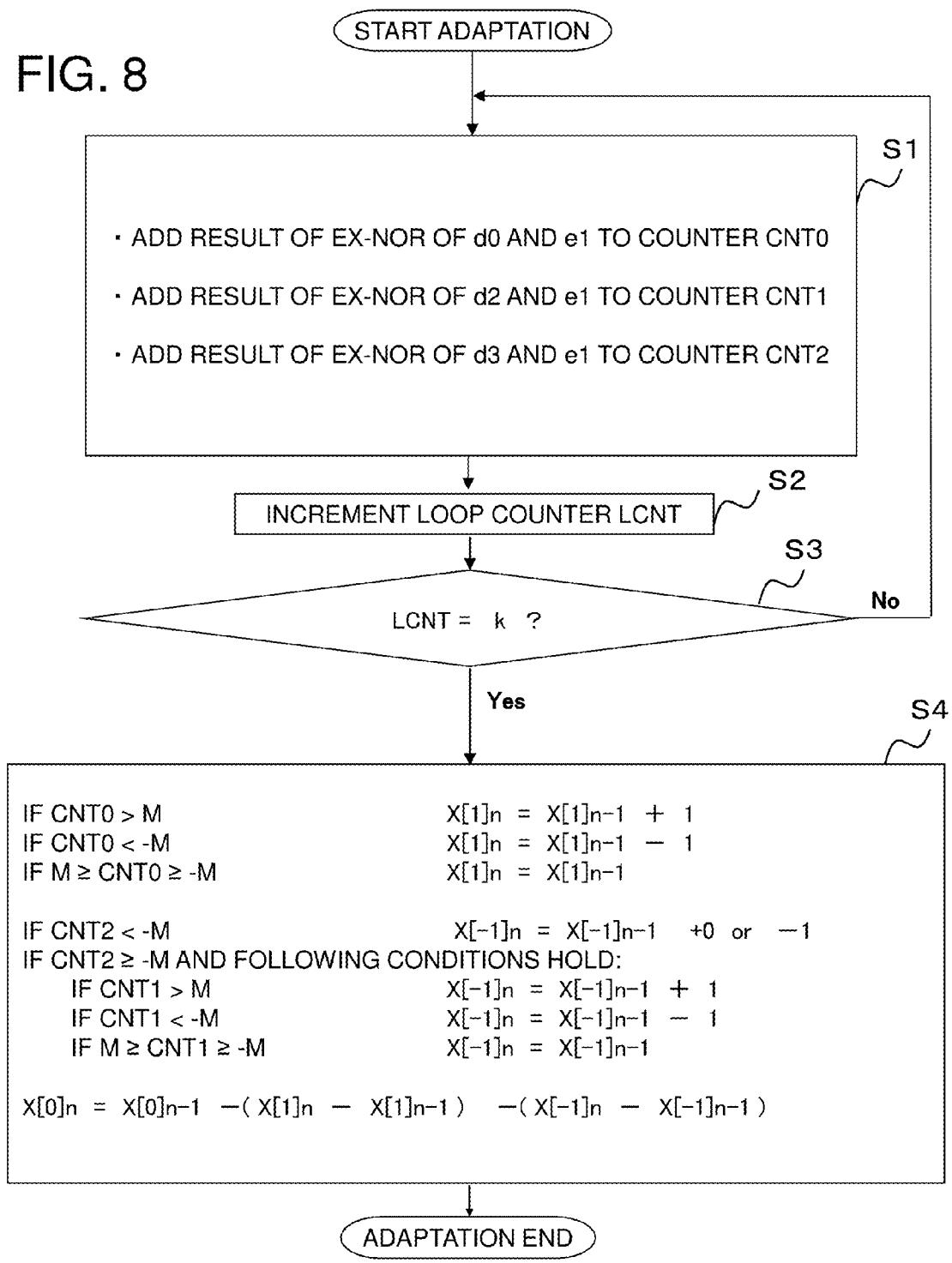

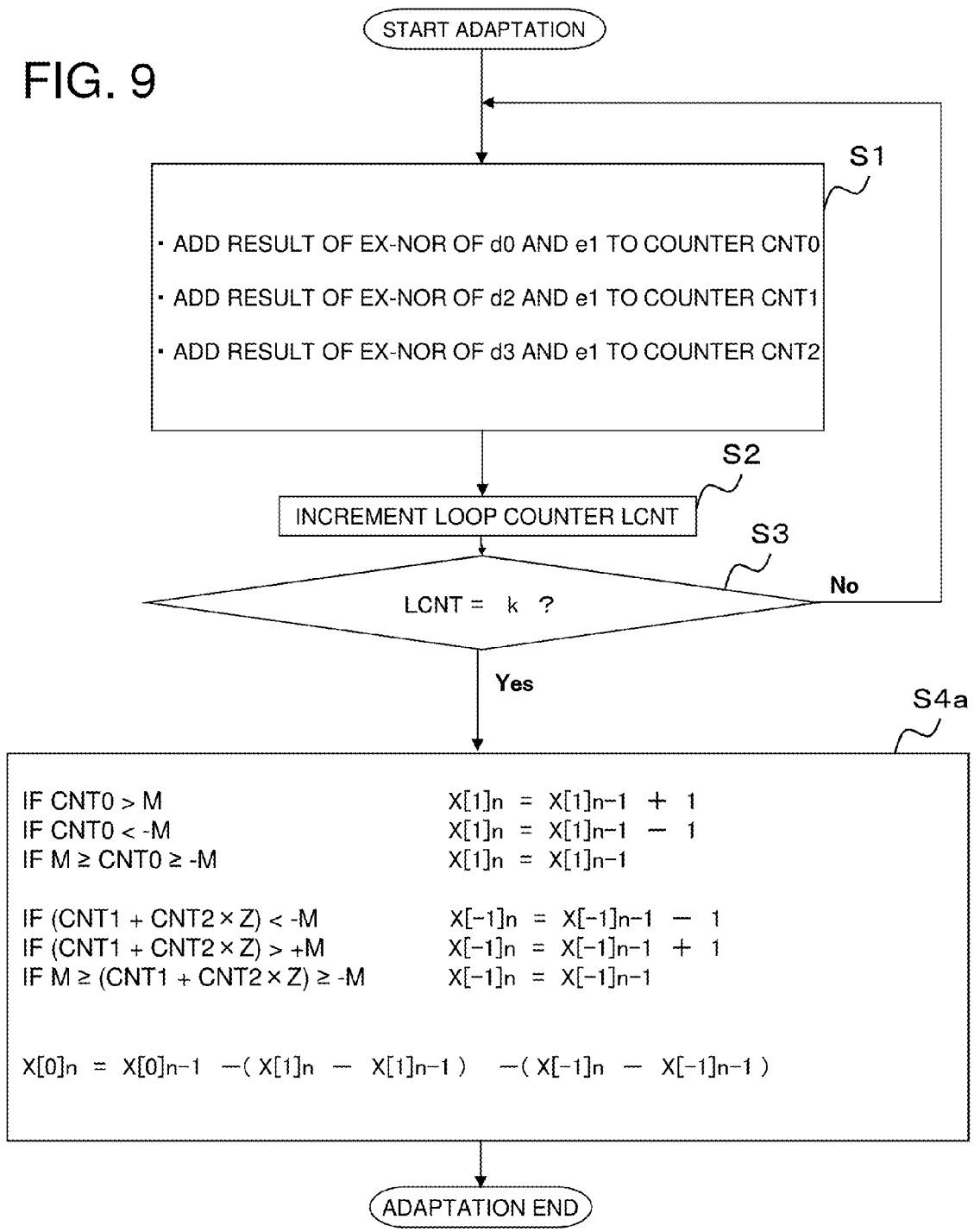

FIG. 13A

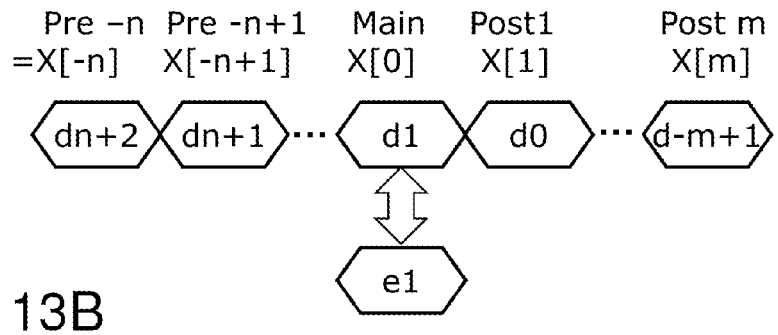

FIG. 13B

IN CASE THE SIGN OF THE THRESHOLD VALUE OF
THE ERROR SAMPLER IS PLUS
EQUATIONS FOR CALCULATING SS-LMS:
   $\Delta X[-n:m]=e[1]\times d[n+2:-m+1]$   ···EQUATION (1)

$\Rightarrow X[k]_n = X[k]_{n-1} + \Delta X[k] \times$ Step   ··· EQUATION (2)

TWO VALUES OF e(k), d(k): +1 OR -1
STEP: X COEFFICIENT RESOLUTION

FIG. 13C

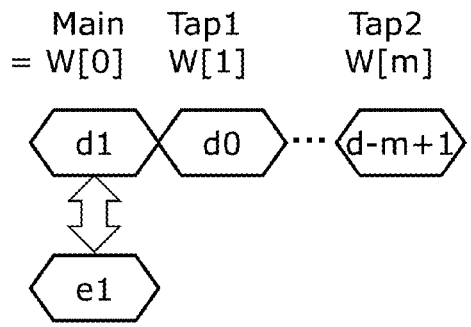

FIG. 13D

IN CASE THE SIGN OF THE THRESHOLD VALUE OF
THE ERROR SAMPLER IS PLUS
EQUATIONS FOR CALCULATING SS-LMS:
   $\Delta W[0:m]=e[1]\times d[1:-m+1]$   ··· EQUATION (1)

$\Rightarrow W[k]_n = W[k]_{n-1} + \Delta W[k] \times$ Step   ··· EQUATION (2)

TWO VALUES OF e(k), d(k): +1 OR -1
STEP: W COEFFICIENT RESOLUTION

FIG. 15A
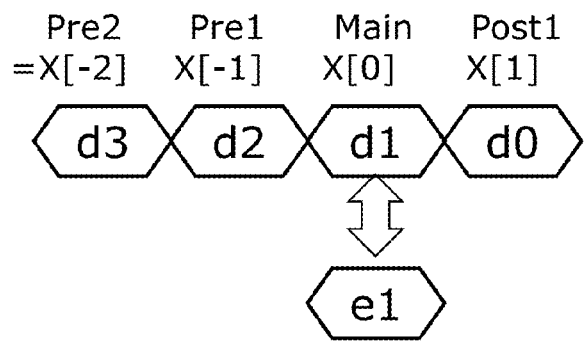
FIG. 15B
IN CASE THE SIGN OF THE THRESHOLD VALUE
OF THE ERROR SAMPLER IS PLUS, THE SAME
AS IN FIG.5B
  ΔX[-2:1]=e[1] · d[3:0]
⇒X[k]ₙ=X[k]ₙ₋₁+ΔX[k] · Step
FIG. 15C
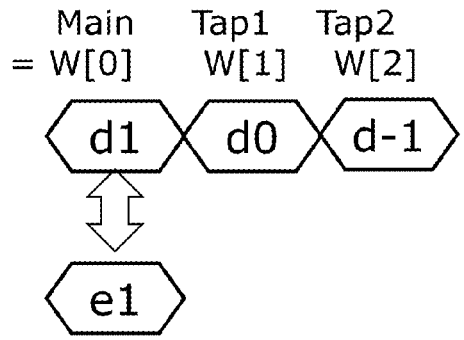
FIG. 15D
IN CASE THE SIGN OF THE THRESHOLD VALUE OF
THE ERROR SAMPLER IS PLUS
EQUATIONS FOR CALCULATING SS-LMS:
   ΔW[0:2]=e[1]×d[1:-1]
⇒W[k]ₙ=W[k]ₙ₋₁+ΔW[k]×Step
TWO VALUES OF e(k), d(k): +1 OR -1
STEP: W COEFFICIENT RESOLUTION FIG. 18
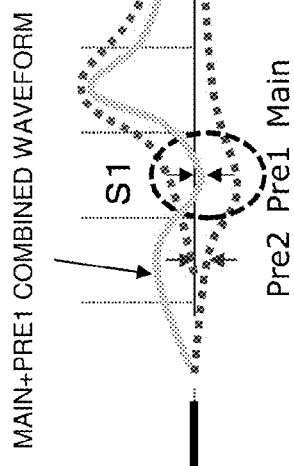
(a)
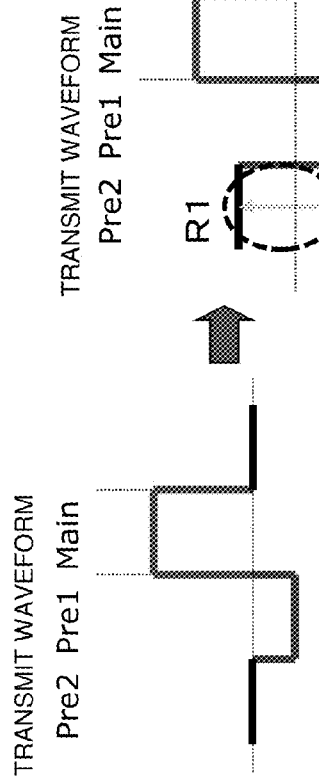
(b)
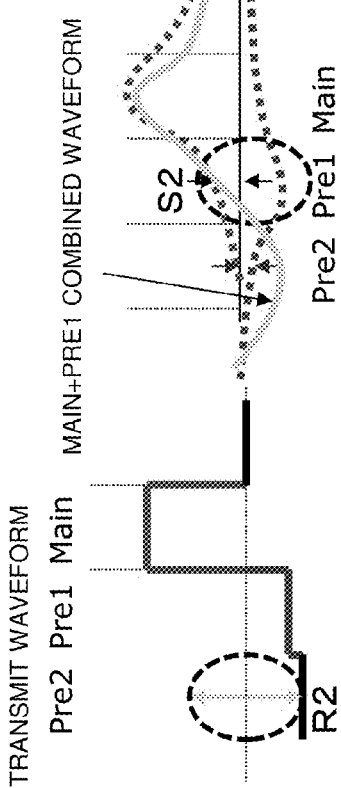
(c)

EQUALIZER AND SEMICONDUCTOR DEVICE

REFERENCE TO RELATED APPLICATION

This application is based upon and claims the benefit of priority of Japanese patent applications No. 2012-280517 filed on Dec. 25, 2012 and No. 2013-214514 filed on Oct. 15, 2013, the disclosure of which is incorporated herein in its entirety by reference thereto. This invention relates to an equalizer and to a semiconductor device. More particularly, it relates to a receiver-side equalizer that controls coefficients of a transmit-side equalizer, in serial data transmission, and to a semiconductor device on which to load the equalizer.

TECHNICAL FIELD

Background

With speeding up of an interface in serial data transmission, signal deterioration due to bandwidth limiting in transmission path, that is, inter-symbol interference (ISI), is more markedly increased. It is thus necessary to provide each of a transmit-side and a receiver-side in serial data transmission with an equalizer for restoring a signal otherwise deteriorated due to bandwidth limitation. Such an arrangement is oftentimes used in which there are mounted a feed forward equalizer (FFE) as a transmit-side equalizer, and a continuous time linear equalizer (CLTE) or a decision feedback equalizer (DFE) as a receiver-side equalizer (See Patent Literature 1 and Non-Patent Literature 1).

According to Non-Patent Literature 1, a transmit-side equalizer coefficient becoming excessively greater than an optimum value is taken to be ascribable to a fact that phase adjustment by a clock and data recovery (CDR) on the receiver-side is performed simultaneously with optimization (adaptation) of coefficients in a transmit-side equalizer. If precursor coefficients of the transmit-side equalizer are rendered stronger to correct the ISI, an edge position of a waveform is changed. When the edge position of waveform is changed, a CDR on the receiver-side follows the edge, as a result of which the ISI is produced at a precursor position. It is thus decided that precursor correction by adaptation is excessively small, so that control is performed to render the precursor coefficient stronger.

To solve this issue, in the Non-Patent Literature 1, data used in optimizing the equalizer coefficient is filtered and only a 110/001 pattern is used, at the same time as a decision threshold of an edge sampler is adjusted to adjust the CDR lock phase position.

[Patent Literature 1] JP Patent Kokai Publication No. 2012-170079A

[Non-Patent Literature 1] Jihong Ren et al., "Precursor ISI Reduction in High-Speed I/O", 2007 Symposium on VLSI Circuits Digest of Technical Papers, p 134-135

SUMMARY

The following gives an analysis of the related techniques.

In Non-Patent Literature 1, since the DFE is implemented as a form of a partial response DFE (PrDFE), such a mechanism that adjusts a decision threshold value of an edge sampler is provided from the beginning, and the function of such mechanism is exploited. Thus, in the absence of the PrDFE, it is necessary to provide an additional circuit to adjust the threshold value of the edge sampler. It is also necessary to provide a circuit to filter a 110/001 pattern. Moreover, with being limited to such a pattern, it is most likely that the follow-up performance of the CDR is deteriorated.

Other issues and novel features of the invention will become more apparent from the following description of the present specification and the drawings.

According to one of the embodiments, in optimizing coefficients of a transmit-side equalizer by control from a receiver-side, a sign-sign least mean square (SS-LMS) algorithm is used in the same way, as when coefficients of a receiver-side decision feedback equalizer (DFE) are optimized. In this case, coefficients of the precursor of the transmit-side equalizer converge to values greater than in the case of setting in which an eye opening of an equalized waveform on the receiver-side is opened to an utmost extent. This leads to an inconvenience that the equalizer coefficients become excessively stronger than the optimum equalizer coefficients.

In order to suppress coefficients of the transmit-side precursor from becoming greater than an optimum value, the present inventors have directed attention to an ISI of a position of a precursor 2 preceding a precursor 1 by further one unit time. Referring to FIG. 17, it is the ISI at the position of the precursor 2 (Pre2) caused to exist by the ISI of the precursor 1 (Pre1) as indicated at Q that accounts for the precursor coefficients of the transmit-side equalizer becoming greater than the optimum values. The present inventors conceived that the above inconvenience might be removed by monitoring the ISI at the position of the precursor 2 (Pre2) caused to exist by the ISI of the precursor 1 (Pre1) and by using the monitored result in calculating coefficients of the precursor 1.

More specifically, the coefficients of the precursor 2 are calculated by SS-LMS in the course of the calculations for adaptation, and the ISI of the precursor 2 is monitored from the result of the calculations such as to suppress excessive increase in the tap coefficients of the precursor 1. However, since the transmit-side equalizer is not provided with a tap of the precursor 2, the results of calculations of the tap coefficient for the precursor 2 are used after all only in the course of calculations of the tap coefficient for the precursor 1 on the receiver-side.

The calculations by the SS-LMS algorithm may be represented in general by the equations (1-1), (1-2) shown in FIG. 5. That is, the information as to in which direction (plus or minus) the current coefficient is to be changed by 1 1$sb$ at the next step may be obtained from the calculations of FIG. 5. When the result of calculations indicates [+1], 1 1$sb$ is added to the coefficient, whereas, when the result of calculations indicates [−1], 1 1$sb$ is subtracted from the coefficient. This operation is repeated until the coefficients converge to an optimum value.

When the tap coefficient of the precursor 1 becomes excessively large such that the ISI at the position of the precursor 2 is increased, the ISI at the position of the precursor 2 is necessarily a minus-side ISI, as indicated by a waveform R next following the synthesis of Main+Pre1 of FIG. 17. When an adaptation logic (control unit executing equalization control) performs SS-LMS calculations on the coefficient of the precursor 2, the result of calculations [−1], that causes the coefficient of the precursor 2 to be changed in the minus direction, is obtained. The minus-side coefficient corrects the waveform to the plus-side in terms of an operation of the FFE of the transmit-side equalizer. The adaptation logic monitors that the result of calculations of the precursor 2 is [−1] to use the result of the calculations in calculating the coefficient of the precursor 1 to suppress the coefficient of the precursor 1 from becoming greater than its optimum value.

An equalizer according to an exemplary embodiment includes a first discrimination circuit that receives an input signal corresponding to a signal output from a transmit-side equalizer to perform binarization of the input signal by a first threshold value in unit time. The equalizer also includes a second discrimination circuit that perform binarization of the input signal by a second threshold value in unit time. The equalizer also includes a first delay circuit that receives an output signal of the first discrimination circuit and that is made up of an N-number of stages of unit delay circuits connected in cascade and operating in unit time, N being an greater than or equal to 2. The equalizer also includes a second delay circuit that receives an output signal of the second discrimination circuit and that is made up of not less than an (N+1)-number of stages of unit delay circuits connected in cascade and operating in unit time. The equalizer also includes a control unit that receives a first output signal, which is an output of the first delay circuit, and a second output signal, which is an output of the second discrimination circuit. The control unit exercises control so that, in case the polarity of the first output signal and that of the second output signal are not coincident with each other, a coefficient of a temporally most precedent precursor in the transmit-side equalizer will not be increased.

An equalizer according to another exemplary embodiment of the present invention includes a first discrimination circuit that receives an input signal corresponding to a signal output from a transmit-side equalizer to perform binarization of the input signal by comparing the input signal with a first threshold value to produce a binary signal in unit time. The equalizer also includes a second discrimination circuit perform binarization of the input signal by comparing the input signal with a second threshold value to produce a binary signal in unit time. The equalizer also includes a first delay circuit that receives an output signal of the first discrimination circuit and that is made up of an N-number of stages of unit delay circuits connected in cascade and operating in unit time, N being an greater than or equal to 2. The equalizer also includes a second delay circuit that receives an output signal of the second discrimination circuit and that is made up of not less than an (N+1)-number of stages of unit delay circuits connected in cascade and operating in unit time. The equalizer further includes a control unit that receives a first output signal, which is an output of the first delay circuit, a second output signal, which is an output of the second discrimination circuit, and a third output signal, which is an output of the first stage unit delay circuit of the second delay circuit. The control unit exercises control so that a coefficient of the temporally most precedent precursor in a transmit-side equalizer will be (1) increased, (2) decreased or (3) unchanged, respectively, depending on whether $t1+t2 \cdot Z$ is (1) greater than a second value, (2) less than a third value or (3) not greater than the second value and not less than the third value, where $t1$ is the number of times that the polarities of the first and third signals are coincident with each other less the number of times that the polarities of the first and third signals are not coincident with each other and $t2$ is the number of times that the polarities of the first and second signals are coincident with each other less the number of times that the polarities of the first and second signals are not coincident with each other, for a preset time period which is an integer number times of the unit time, $Z$ being a positive real number.

According to the exemplary embodiments of the present invention, it is possible to improve the equalization characteristic by a simpler configuration.

Still other features and advantages of the present invention will become readily apparent to those skilled in this art from the following detailed description in conjunction with the accompanying drawings wherein only exemplary embodiments of the invention are shown and described, simply by way of illustration of the best mode contemplated of carrying out this invention. As will be realized, the invention is capable of other and different embodiments, and its several details are capable of modifications in various obvious respects, all without departing from the invention. Accordingly, the drawing and description are to be regarded as illustrative in nature, and not as restrictive.

BRIEF DESCRIPTION OF THE DRAWINGS

FIG. 4 is a schematic diagram illustrating the manner of how a demultiplexer outputs parallel form signals.

FIGS. 5A and 5B illustrate a method of calculating FFE coefficients.

FIG. 8 is a flowchart illustrating an example operation of the control unit.

FIG. 9 is a flowchart illustrating another example operation of the control unit.

FIGS. 13A to 13D illustrate a method of calculating FFE and DFE coefficients.

FIG. 15A and FIG. 15D illustrate case where m=2 and n=1 in FIGS. 13A to 13D.

FIG. 18 illustrates signal waveforms at various parts in a test method conducted on Examples 1 and 2 for simulation.

MODES

Figure 1:
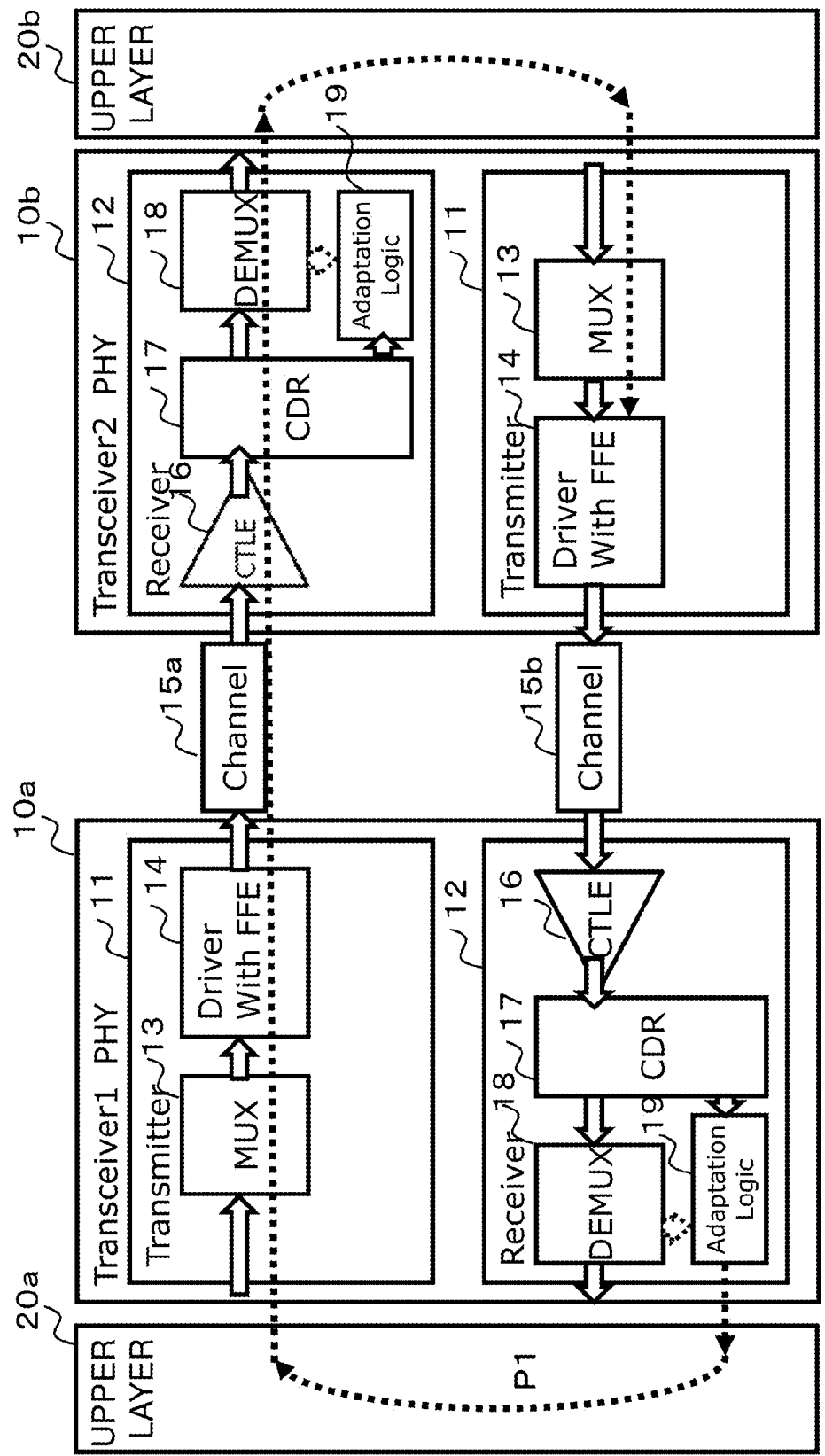
FIG. 1 is a block diagram illustrating a configuration of a transmission system according to a first exemplary embodiment.

While the invention is susceptible to various modifications and alternative forms, specific embodiments are shown only by way of example in the drawings and are herein described in detail. It should be understood, however, that the drawings and detailed descriptions thereto are not intended to limit the invention to the particular modes disclosed, but on the contrary, the invention is to cover all modifications, equivalents, and alternatives falling within the spirits and scope as defined in claims.

In one aspect, the equalizer includes first and second discrimination circuits (samplers SP1 and SP2 of FIG. 2) that receive in common an input signal corresponding to a signal output from a transmit-side equalizer. The first discrimination circuit binarizes the input signal by a first threshold value in unit time. The second discrimination circuit binarizes the input signal by a second threshold value in unit time. The equalizer also includes a first delay circuit that receives an output signal output from the first discrimination circuit. The first delay circuit comprises an N-number of stages of unit delay circuits (D11 and D12 of FIG. 2) connected in cascade, with each of the unit delay circuits operating in unit time, wherein N is an greater than or equal to 2. The equalizer also includes a second delay circuit that receives an output signal output from the second discrimination circuit. The second delay circuit comprises not less than an (N+1)-number of stages of unit delay circuits (D21, D21, and D23 of FIG. 2) connected in cascade, with each of the unit delay circuits operating in unit time. The equalizer further includes a control unit (19 of FIG. 2) that receives a first output signal (e1 of FIG. 2) output from the first delay circuit, and a second output signal (d3 of FIG. 2) output from the second discrimination circuit. The control unit exercises control so that, when polarities of the first output signal and the second output signal are not coincident with each other, a tap-coefficient for a temporally most precedent precursor in the transmit-side equalizer (corresponding to x−1 of FIG. 2) will not be increased.

In the equalizer, the control unit may further receive a third output signal (d2 of FIG. 2) of the first stage unit delay circuit of the second delay circuit. The control unit may perform control so that, when the polarities of the first and second output signals are coincident with each other, the coefficient of the temporally most precedent precursor is respectively increased or decreased depending on whether the polarities of the first and third output signals are coincident or non-coincident with each other.

In the equalizer, the control unit (19 of FIG. 6) may include a first counter (CNT2 of FIG. 6) that counts in one direction in unit time when coincidence of the polarities of the first and second output signals with each other and in the opposite direction in unit time otherwise. The control unit may perform control so that, when the value of the first counter is less than a first value, the coefficient for the temporally most precedent precursor will not be increased.

In the equalizer, the control unit may include a second counter (CNT1 of FIG. 6) that counts in one direction in unit time when coincidence of the polarities of the first and third output signals with each other and in the opposite direction at an interval of the unit time otherwise. The control unit may perform control so that, when the value of the first counter is not less than the first value, the coefficient of the temporally most precedent precursor will be (a) increased, (b) decreased or (c) unchanged, respectively, depending on whether the value of the second counter is (a) greater than a second value, (b) less than a third value or (c) not greater than the second value and not less than the third value.

In another preferred mode, the equalizer may include first and second discrimination circuits that receive in common an input signal corresponding to a signal output from a transmit-side equalizer. The first and second discrimination circuit binarizes the input signal by a first threshold value in unit time. The second discrimination circuit binarizes the input signal by a second threshold value in unit time. The equalizer may also include a first delay circuit that receives an output signal output from the first discrimination circuit. The first delay circuit comprises an N-number of stages of unit delay circuits connected in cascade, with each of the unit delay circuits configured to operate in unit time, wherein N is an greater than or equal to 2. The equalizer may also include a second delay circuit that receives an output signal output from the second discrimination circuit. The second delay circuit comprises not less than an (N+1)-number of stages of unit delay circuits connected in cascade, with each of the unit delay circuits configured to operate in unit time. The equalizer may further include a control unit that receives a first output signal, output from the first delay circuit, a second output signal output from the second discrimination circuit, and a third output signal output from the first stage unit delay circuit of the second delay circuit. The control unit may perform control so that a tap-coefficient for the temporally most precedent precursor in a transmit-side equalizer will be (a) increased, (b) decreased or (c) unchanged, respectively, depending on whether $t1+t2\cdot Z$ is (a) greater than a second value (value of M of FIG. 9), (b) less than a third value (value of −M of FIG. 9) or (c) not greater than the second value and not less than the third value, where, for a preset time period which is an integer number times of the unit time (time period that LCNT=k in FIG. 9), t1 is the number of times that the polarities of the first and third signals are coincident with each other less the number of times that the polarities of the first and third signals are not coincident with each other (value of CNT1 of FIG. 9), t2 is the number of times that the polarities of the first and second signals are coincident with each other less the number of times that the polarities of the first and second signals are not coincident with each other (value of CNT2 of FIG. 9), and Z is a positive real number.

In the equalizer, the second value may be M, M being a positive real number, and the third value may be −M.

In the equalizer, Z may be 1 to 2.

In the equalizer, the control unit may perform control so as not to increase the coefficient of the precursor for $t2<-M$.

In the equalizer, the control unit may perform control so that a sum total of the widths of changes of settable equalization coefficients of the transmit-side equalizer will be constant.

The equalizer may further include a serial-to-parallel conversion circuit (18 of FIG. 3) that receives the output signals of the first and second discrimination circuits and transforms the signals into a parallel signal form to hold the resulting parallel signals and that outputs the parallel signals to the control unit at an interval of N unit times. The control unit (19 of FIG. 3) may control the coefficient of the temporally most precedent precursor at an interval of N unit times.

The control unit may further include an adder circuit (Add of FIG. 12) that performs weighted addition of part or all of output signals of the unit delay circuits of the second delay circuit and that further performs weighted addition of the weighted addition result and a signal output from a transmit-side equalizer. The first and second discrimination circuits may receive an output signal of the weighted addition circuit as an input signal.

A semiconductor device may include the above described equalizer.

It should be understood that, as regards the ranges of numerical values, set out in the present specification, optional numerical values as well as optional sub-ranges of the numerical values, included in the ranges of numerical values, are specifically indicated even if these are not set out explicitly.

According to the above described equalizer, a simplified calculation function may be implemented without increasing the number of taps in the transmit-side equalizer or providing additional circuitry to a high speed operating part on the receiver-side. With these arrangements, it is possible to prevent an eye opening from becoming deteriorated due to a tap coefficient for a precursor becoming greater than an optimum value, thereby allowing for improving a reception characteristic.

More concrete exemplary embodiments will now be explained in detail with reference to the drawings.

EXEMPLARY EMBODIMENT 1

FIG. 1 is a block diagram illustrating a configuration of a transmission system according to a first exemplary embodiment. Referring to FIG. 1, the transmission system includes transceiver units 10a and 10b arranged on both sides of channels 15a and 15b operating as transmission channels. In terms of a transmission system, the transceiver units 10a and 10b are equivalent to physical layers, and are respectively connected to upper layer sections 20a and 20b. Also, the transceiver units 10a and 10b are of the same structure, and are respectively provided with a transmitter unit 11 and a receiver unit 12.

The transmitter unit 11 includes a multiplexer (MUX) 13 and a driver 14. The multiplexer 13 receives parallel data from the upper layer section 20a (20b) and transforms the received data into serial data which is sent to the driver 14. The driver 14 has a function of an FFE, as a transmitting side equalizer, and performs waveform equalization on a signal received from the multiplexer 13 to transmit a resulting signal to the channel 15a (15b).

The receiver unit 12 includes a CLTE 16, a CDR 17, a demultiplexer (DEMUX) 18 and a control unit 19 having an adaptation function. The CLTE 16 is a linear equalization circuit including analog circuit elements or the like, not shown, to correct a frequency response. It receives a signal from the channel 15a (15b) to correct the frequency response to deliver an output signal to the CDR 17. The CDR has on board a PLL (Phase Locked Loop) or the like and extracts a clock component from the output signal of the CTLE 16 to reproduce data in synchronism with the clock signal. The demultiplexer (DEMUX) 18 transforms the reproduced data into parallel data which is sent to the upper layer sections 20a (20b). The control unit 19 receives the data from the CDR 17 or the demultiplexer (DEMUX) 18 to calculate coefficients of the FFE in the driver 14 in the transmitter unit 11 located on an opposite side to transmit the calculation result to the upper layer section 20a (20b).

In the above described transmission system, the calculation result of the FFE coefficients from the control unit 19 of the transceiver unit 10a is transmitted through a path indicated by a broken line P1 to the driver 14 of the transceiver unit 10b in accordance with a preset protocol. That is, the calculation result is transferred to the driver 14 of the transceiver unit 10b via the upper layer section 20a and the transmitter unit 11 of the transceiver unit 10a, channel 15a, receiver unit 12 of the transceiver unit 10b and the upper layer section 20a of the transceiver unit 10b. The coefficients of the FFE of the driver 14 of the transceiver unit 10b are set so as to correspond to the calculation result as found by the control unit 19 of the transceiver unit 10a. In transmitting data to the receiver unit 12 of the transceiver unit 10a over the channel 15b, the driver 14 of the transceiver unit 10b outputs a signal waveform-equalized by the FFE.

A calculation result sent out from the control unit 19 of the transceiver unit 10b, is transmitted to the driver 14 of the transceiver unit 10a through a signal path, not shown.

Figure 2:
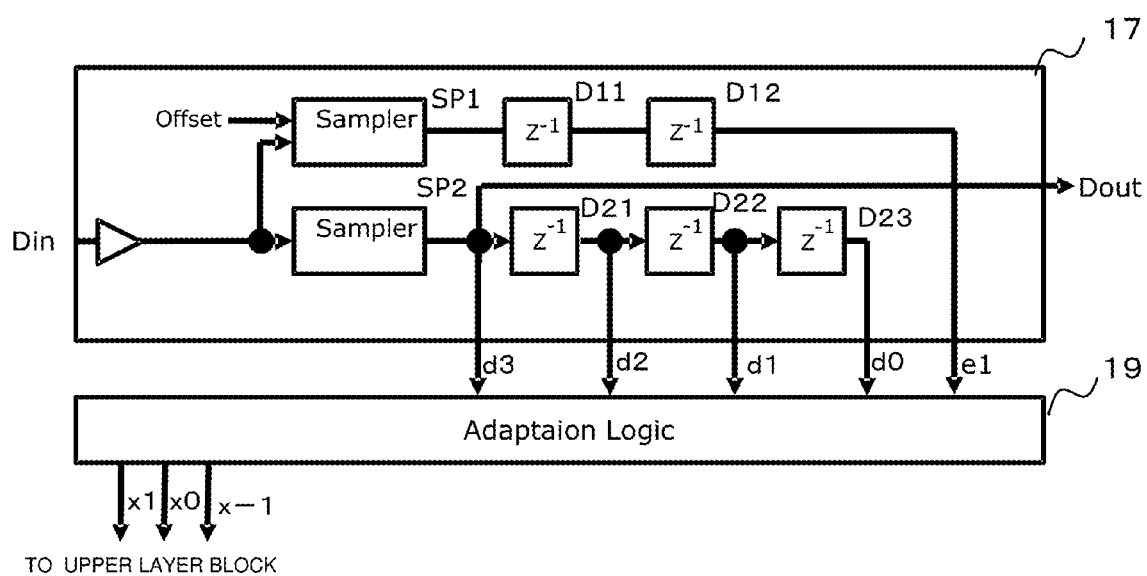
FIG. 2 is a block diagram illustrating a configuration of a CDR and a control unit according to the first exemplary embodiment.

The following describes the CDR 17 and the control unit 19 in detail. FIG. 2 is a block diagram illustrating a configuration of the CDR 17 and the control unit 19 according to the first exemplary embodiment. In FIG. 2, only a data extraction function is illustrated and a clock extraction function of the CDR 17 is not shown. In FIG. 2, an example of the control unit 19 in which an FFE has three taps is shown.

The CDR 17 includes sampling circuits (discrimination circuits) SP1 and SP2 and unit delay circuits D11, D12, D21, D22 and D23.

The sampling circuits SP1 and SP2 operate as data samplers that binarizes a signal Din received from the CLTE 16 responsive to timing of a clock signal, that is, in unit time, and holds the binary data. The sampling circuits SP1 and SP2 perform binarization of the signal D by comparing the signal Din received in common with zero and offset levels, respectively, each producing a binary signal.

The unit delay circuits D11 and D12, which are connected in cascade and constitute a first delay circuit, each of which operates in unit time, function as a first shift register. The delay circuit D11, as a first stage of the first shift register, receives the binary signal output from the sampling circuit SP1.

The unit delay circuits D21, D22 and D23, which are connected in cascade and constitute a second delay circuit, each of which operates in unit time, function as a second shift register. The unit delay circuit D21, as a first stage of the second shift register, receives the binary signal output from the sampling circuit SP2.

The control unit 19 receives in parallel signals d3, d2, d1 and d0 output from the sampling circuit SP2 and the unit delay circuits D21, D22 and D23, respectively, and a signal e1 output from the unit delay circuit D12, at the same time. The control unit 19 finds x1, x0 and x−1, corresponding, respectively to coefficients of three taps of the FFE, as results of calculations, and outputs the coefficients to an upper layer block (upper layer section).

Figure 3:
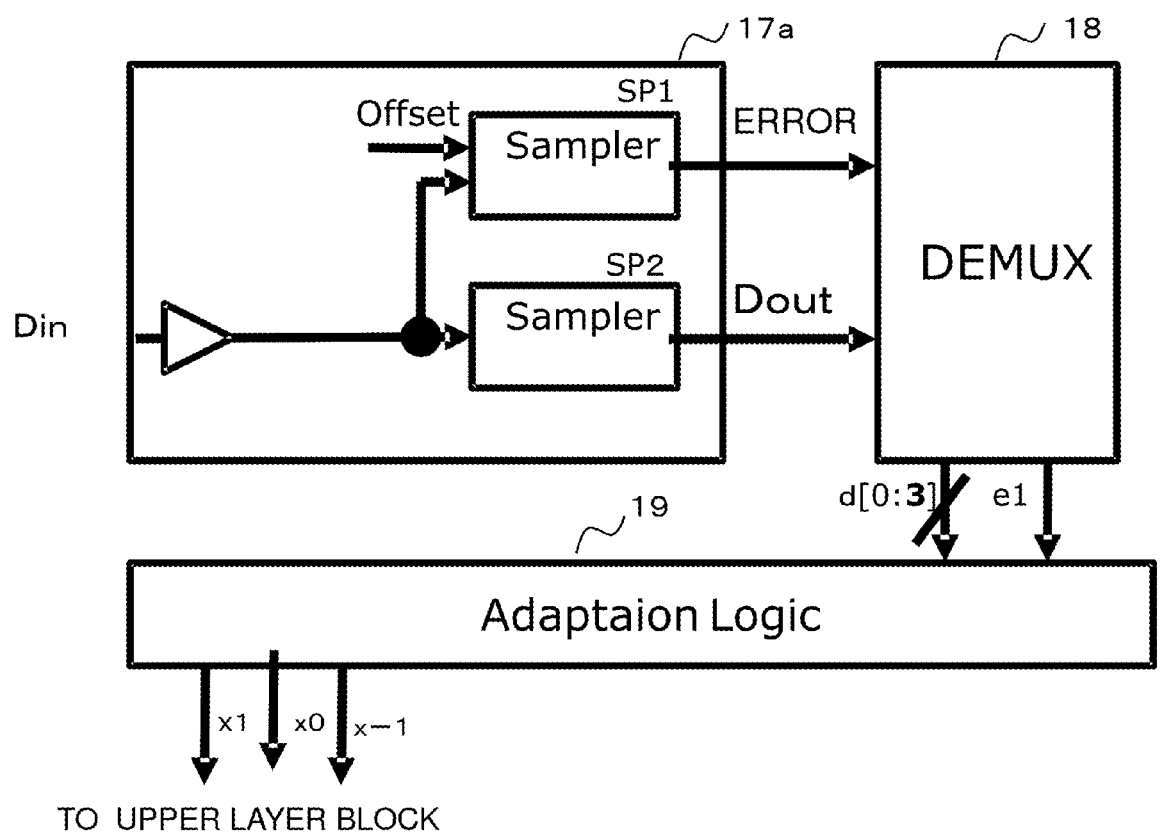
FIG. 3 is a block diagram illustrating a modified configuration of the CDR and the control unit according to the first exemplary embodiment.

The following describes another configuration of the CDR 17 and the control unit 19 according to the first exemplary embodiment. FIG. 3 is a block diagram illustrating another configuration of the CDR 17a and the control unit 19. In FIG. 3, a clock extraction function of a CDR 17a is not shown. The CDR 17a includes sampling circuits SP1 and SP2. The demultiplexer 18 receives output signals (Error and Dout) output from the sampling circuits SP1 and SP2 and outputs a parallel signal d[0:3] and a signal e1 to the control unit 19 in every four unit times.

FIG. 4 schematically illustrates a manner in which the demultiplexer 18 outputs a parallel signal d[0:3] and the signal e1. Specifically, in FIG. 4, the signals Dat0, Dat1, Dat2, Dat3 and Err2 are output as the signal d[0:3] and that the signal e1, and the signals Dat4, Dat5, Dat6, Data7 and Err6 are output as the signal d[0:3] and the signal e1, each in four unit times.

In the case wherein the demultiplexer 18 is adopted as shown in FIG. 3, it suffices that the control unit 19 finds the results of calculations x1, x0 and x−1 every four unit times. Hence, the control unit 19 may calculate the coefficients in a time interval four times as long as that required for the case of FIG. 2, thereby being allowed to cope with a higher frequency of a clock signal.

The following describes a calculation function of the FFE coefficients in the control unit 19. FIGS. 5A and 5B illustrate a method for calculating the FFE coefficients. It is here assumed that the offset (Offset) in the sampling circuit SP1 is +. As a principle, the calculations of the FFE coefficients are made using the SS-LMS algorithm. That is, correction terms of respective coefficients are found in accordance with the following equation:

$$\Delta X[-2:1]=e1 \times d[3:0], \text{ as shown by Equation (1-1) in FIG. 5B,}$$

where [ ] indicates that calculations are made individually for respective array elements.

The respective coefficients are then increased or decreased in amounts corresponding to the correction terms $\Delta X[-2:1]$ to have new coefficients as follows:

$$X[k]_n = X[k]_{n-1} + \Delta X[k] \times \text{Step}$$

as shown by Equation (1-2) of FIG. 5. With Step=1, a new coefficient for X[−1] is found in accordance with the following equation (1-3a) or (1-3b):

$$X[-1]_n = X[-1]_{n-1} + 0 \text{ or } -1 \text{ for } \Delta X[-2]=-1 \qquad \text{Equation (1-3a)}$$

$$X[-1]_n = X[-1]_{n-1} + \Delta X[-1] \text{ for } \Delta X[-2]=1 \qquad \text{Equation (1-3b)}$$

In the above described method for updating the coefficients, when $\Delta X[-2]=1$, X[−1] is updated in accordance with the principle correction method as indicated by the equation (1-3b), while, when $\Delta X[-2]=-1$, X[−1] is updated so as not to cause the coefficient to be increased, as indicated by the equation (1-3a). That is, the coefficient x[−1] of a precursor temporally most precedent on the transmit-side equalizer is prevented from being excessively increased by the correction term $\Delta X[-2]$ that is temporally preceding the coefficient X[−1] of the receiver-side precursor a further by one time.

The above described configuration is based upon the basic operating principle in the control unit 19. Several example modifications of the control unit 19, which will enable the performance to be improved further, will now be explained.

Figure 6:
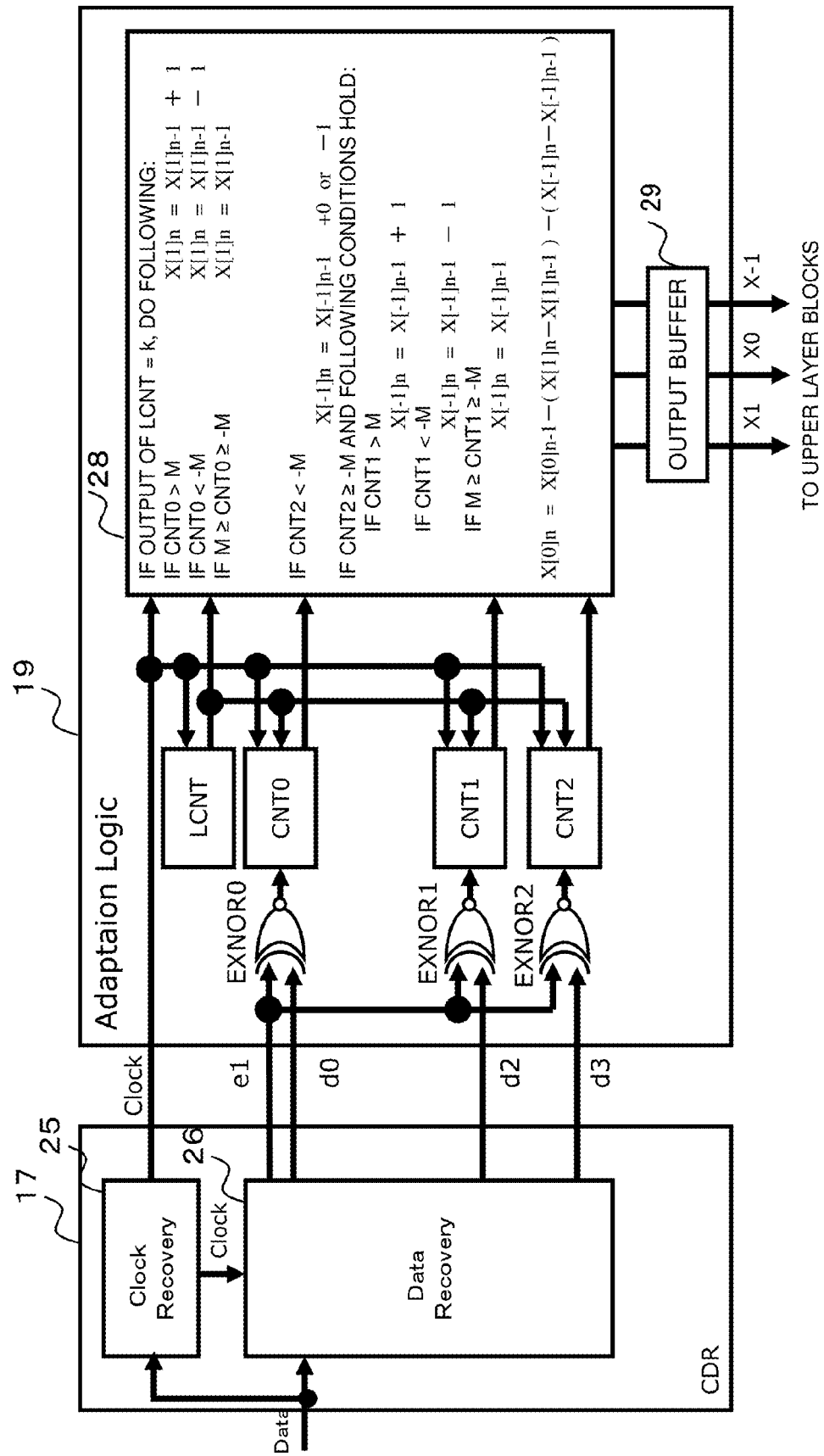
FIG. 6 is a block diagram illustrating details of a configuration of the CDR and the control unit according to the first exemplary embodiment.

FIG. 6 is a block diagram illustrating a configuration of the CDR and the control unit 19 of the first exemplary embodiment. Referring to FIG. 6, the CDR 17 includes a clock recovery circuit 25 that performs an extraction of a clock from the data signal received and a data recovery circuit 26 that includes the sampling circuits SP1 and SP2 and the unit delay circuits D11, D12, D21, D22 and D23 shown in FIG. 2. The clock recovery circuit 25 includes a PLL (Phase Locked Loop) or a phase interpolator (not shown) to generate a clock signal synchronized with the data signal received from an internal clock signal (not shown).

In FIG. 6, the control unit 19 includes two-input exclusive NOR circuits EXNOR0, EXNOR1 and EXNOR2, wherein EXNOR is a logic gate with inversion of an output of an exclusive OR(EXOR)), a loop counter LCNT, counters CNT0, CNT1, CNT2, an arithmetic logic circuit 28 and an output buffer 29.

The exclusive NOR circuits EXNOR0, EXNOR1 and EXNOR2 receive the signal e1 in common at one input ends thereof, while receiving, at the other input ends thereof, the signals d0, d2 and d3, respectively.

The loop counter LCNT counts a clock signal Clock extracted by the clock recovery circuit 25, and outputs a count result to the arithmetic logic circuit 28.

The counters CNT0, CNT1 and CNT2 each include, for example, an up-down counter that performs up-counting or down-counting, responsive to the recovered clock signal Clock, depending on the polarity of the output signals of EXNOR0, EXNOR1 and EXNOR2, respectively. The counters CNT0, CNT1 and CNT2 output a count result to the arithmetic logic circuit 28. The counters are reset when the loop counter LCNT is reset.

When the output of the loop counter LCNT becomes equal to k, the arithmetic logic circuit 28 finds the coefficients x1, x0, and x−1, based upon respective outputs of the counters CNT0, CNT1 and CNT2, and outputs the coefficients to the upper layer block (upper layer section) via the output buffer 29.

Figure 7:
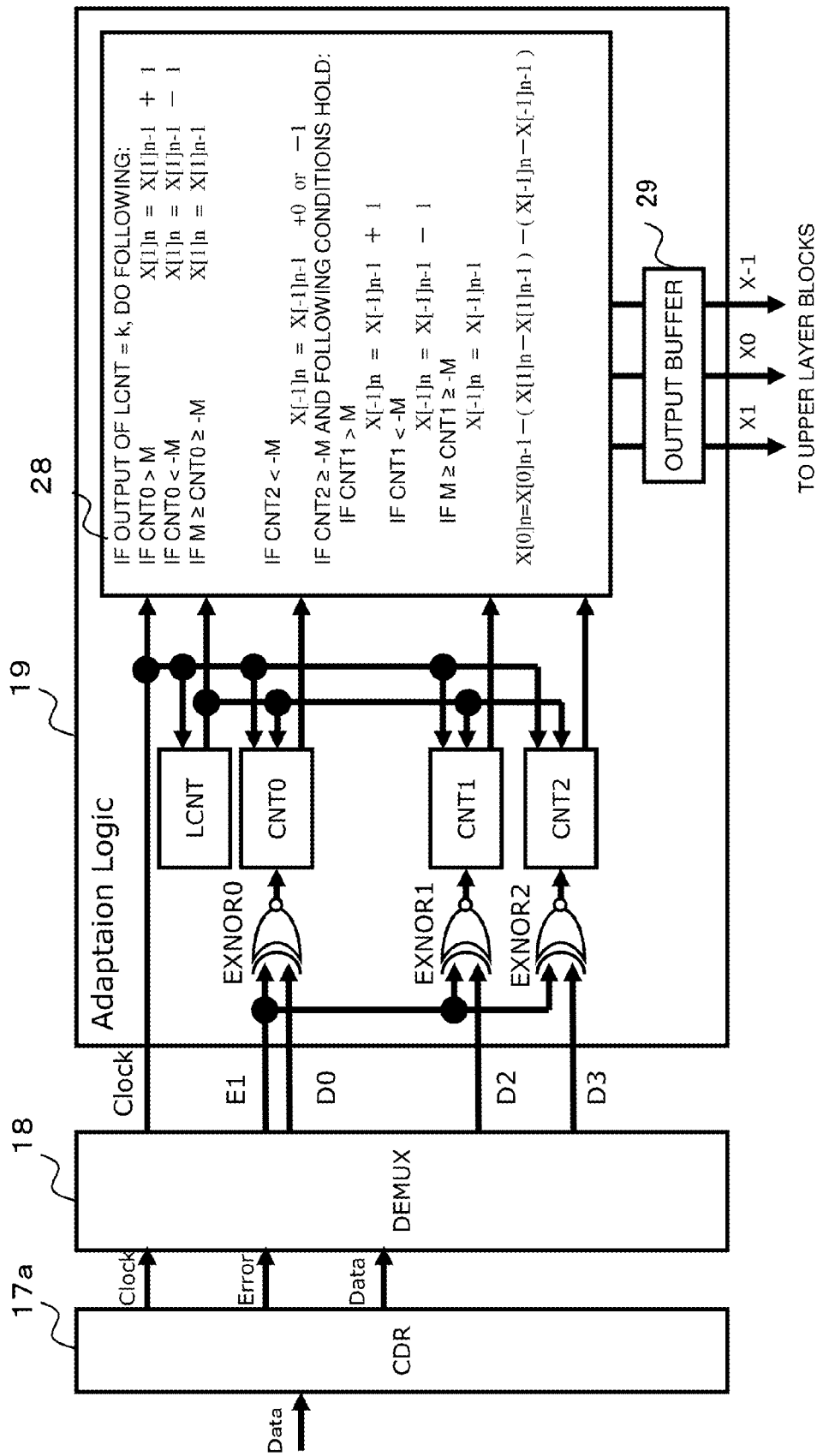
FIG. 7 is a block diagram illustrating details of a modified configuration of the CDR and the control unit according to the first exemplary embodiment.

FIG. 7 is a block diagram illustrating details of another configuration of the CDR and the control unit of the first exemplary embodiment. In FIG. 7, the same symbols as those used in FIG. 6 denote the same parts or components and hence the corresponding description is dispensed with. The CDR 17a and the multiplexer 18 are the same in configuration as those shown in FIG. 3.

The following describes the operation of the control unit 19 of FIG. 7. FIG. 8 is a flowchart illustrating an example operation of the control unit 19 of FIG. 7.

When adaptation is started, in a step S1, the counters CNT0, CNT1 and CNT2 respectively count polarities of output signals of the exclusive NOR circuits EXNOR0, EXNOR1, EXNOR2, responsive to the recovered clock signal Clock.

In a step S2, the loop counter LCNT is incremented.

In a step S3, it is checked whether or not the output of the loop counter LCNT equals k. If the loop counter output is less than k, processing reverts to the step S1. If the loop counter output equals k, the loop counter LCNT is reset, and processing transfers to a step S4.

In a step S4, the arithmetic logic circuit 28 executes a sequence of equations listed below to terminate the processing.

$$\text{If } CNT0 > M, X[1]_n = X[1]_{n-1} + 1 \qquad \text{(Equation 2-1a)}$$

$$\text{If } CNT0 < -M, X[1]_n = X[1]_{n-1} - 1 \qquad \text{(Equation 2-1b)}$$

$$\text{If } M \geq CNT0 \geq -M, X[1]_n = X[1]_{n-1} \qquad \text{(Equation 2-1c)}$$

$$\text{If } CNT2 < -M, X[-1]_n = X[-1]_{n-1} + 0 \text{ or } -1 \qquad \text{(Equation 2-2a)}$$

$$\text{If } CNT2 \geq -M \text{ and } CNT1 > M, X[-1]_n = X[-1]_{n-1} + 1 \qquad \text{(Equation 2-2b)}$$

$$\text{If } CNT2 \geq -M \text{ and } CNT1 < -M, X[-1]_n = X[-1]_{n-1} - 1 \qquad \text{(Equation 2-2c)}$$

and $$\text{if } CNT2 \geq -M \text{ and } M \geq CNT1 \geq -M, X[-1]_n = X[-1]_{n-1} \qquad \text{(Equation 2-2d)}$$

$$X[0]_n = X[0]_{n-1} - (X[1]_n - X[1]_{n-1}) - (X[-1]_n - X[-1]_{n-1}) \qquad \text{(Equation 2-3)}$$

In the above equations, M is a positive integer, x1, x0, and x−1 are respectively expressed as X[1], X[0], and X[−1] and the suffixes denote indices for respective processing unit time.

FIG. 9 is a flowchart for another example operation of the control unit 19. In FIG. 9, each of the steps S1 to S3 is the same as each of the steps S1 to S3 in FIG. 8 and hence the corresponding description is dispensed with.

In a step S4a, the arithmetic logic circuit 28 executes a sequence of equations listed below to terminate the processing.

$$\text{If } CNT0 > M, X[1]_n = X[1]_{n-1} + 1 \qquad \text{(Equation 3-1a)}$$

$$\text{If } CNT0 < -M, X[1]_n = X[1]_{n-1} - 1 \qquad \text{(Equation 3-1b)}$$

$$\text{If } M \geq CNT0 \geq -M, X[1]_n = X[1]_{n-1} \qquad \text{(Equation 3-1c)}$$

If $(CNT1+Z \cdot CNT2) < -M, X[-1]_n = X[-1]_{n-1} - 1$ (Equation 3-2a)

If $(CNT1+Z \cdot CNT2) > M, X[-1]_n = X[-1]_{n-1} + 1$ (Equation 3-2b)

and

If $M \geq (CNT1+Z \cdot CNT2) \geq -M, X[-1]_n = X[-1]_{n-1}$ (Equation 3-2c)

$X[0]_n = X[0]_{n-1} - (X[1]_n - X[1]_{n-1}) - (X[-1]_n - X[-1]_{n-1})$ (Equation 3-3)

It is noted that symbols which are the same as those shown in FIG. 8 have the same meaning. Z is assumed to be a positive integer that stands for a weight.

Figure 10A:
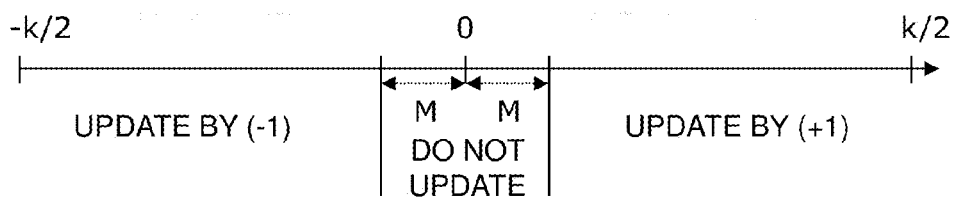
FIGS. 10A and 10B illustrate the operation principle of FIG. 8 and FIG. 9.
Figure 10B:
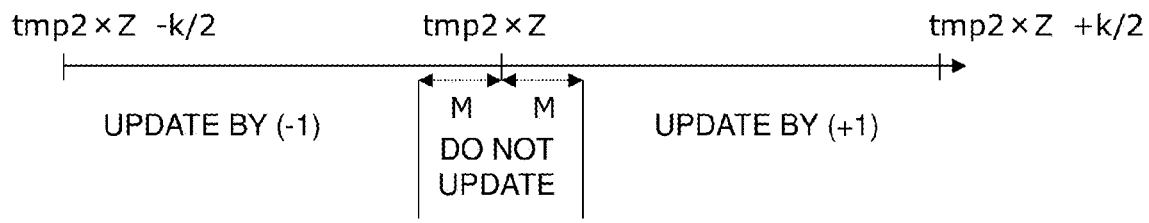

FIGS. 10A and 10B illustrates the operation principle of FIG. 8 (step S4) and FIG. 9 (step S4a), respectively. Referring to FIG. 10A, if, in the step S4 of FIG. 8, respective values of the counters CNT0, CNT1 and CNT2 after accumulating by k samples are within ±M, where ±M is a threshold value, the coefficients X[1], X[0] and X[−1] are not updated. If the respective values of the counters CNT0, CNT1 and CNT2 after accumulating by k samples, exceed M, the coefficients X[1], X[0] and X[−1] are updated by +1. If the respective values of the counters CNT0, CNT1 and CNT2 after accumulating by k samples are less than M, X[1], X[0] and X[−1] are updated by −1.

In this manner, the values of Δx in the equation (1-1) are accumulated using the counters CNT0, CNT1 and CNT2, and the coefficients are updated based upon the accumulation result. Moreover, the threshold value of ±M is used, and the coefficients are updated based upon whether or not the accumulation result has exceeded the threshold value. Since the accumulation and the threshold value are used, the coefficients may not be updated instantaneously due to noise or the like, thus assuring more stable coefficient update operations.

Referring to FIG. 10B, in the step S4a of FIG. 9, the value of CNT2 is weighted by Z, and the threshold value M is applied to the sum of the weighted value and the value of CNT1. The eye opening degree on the receiver-side may be controlled by changing the value of Z.

It is noted that what has been described with reference to FIGS. 10A and 10B is the operation principle which is based upon the accumulation and the threshold value. In actuality, calculations are made so that X[−1] will be prevented from increasing excessively by the CNT2 corresponding to the correction term ΔX[−2] preceding X[−1] by one further unit time, as indicated by the equations (1-3a), (1-3b), as well as by the equations (2-2a) to (2-2d) and (3-2a) to (3-2c).

On the other hand, the value of X[0] corresponding to the main cursor may be set so that, at the time of updating X[1], X[0] and X[−1], the sum total of the update will not be varied, as indicated by the equations (2-3) and (3-3). By providing such a constraint to prevent X[0] from increasing excessively, it is possible to suppress the dynamic range on the transmit-side equalizer to prevent distortion of the transmitted signal.

The methods for calculations, as indicated in the steps S4 and S4a, are not intended to be restrictive, such that diverse modifications are possible. The following describes some examples of these modifications.

(1) Such a method may be used in which, in connection with the equations (1-3a) and (1-3b), a decision is given based upon the sum $\Delta X[-1]+\Delta X[-2]$, which sets Z=1 in the equations (3-2a) to (3-2c), such that if $\Delta X[-1]+\Delta X[-2] \leq 0, X[-1]_n = X[-1]_{n-1} + 0$ or $-1$;

if $\Delta X[-1]+\Delta X[-2] > 0, X[-1]_n = X[-1]_{n-1} + 1$;

(2) Another method may also be used in which, in the equations (3-2a) to (3-2c), Z=1 is set, such that if $(CNT1+CNT2) < -M, X[-1]_n = X[-1]_{n-1} - 1$;

if $(CNT1+CNT2) > M, X[-1]_n = X[-1]_{n-1} + 1$; and if $M \geq (CNT1+CNT2) \geq M, X[-1]_n = X[-1]_{n-1}$;

(3) A still another method may further be used in which, in the equations (2-2a) to (2-2d), CNT1 is replaced by CNT1+CNT2, such that if $CNT2 < -M, X[-1]_n = X[-1]_{n-1} + 0$ or $-1$;

if $CNT2 \geq -M$ and $(CNT1+CNT2) > M, X[-1]_n = X[-1]_{n-11} + 1$;

if $CNT2 \geq -M <$ and $(CNT1+CNT2) < -M, X[-1]_n = X[-1]_{n-1} - 1$;

if $CNT2 \geq -M$ and $M \geq (CNT1+CNT2) \geq -M, X[-1]_n = X[-1]_{n-1}$.

Several example to find X[−1] are listed above. These methods, however, are not intended to be restrictive. The control unit 19 may use a variety of methods for calculations that monitor that the change in X[−2] (coefficient of the precursor 2) is −1 to perform control to suppress X[−1] (coefficient of the precursor 1) from becoming larger than an optimum value.

Figure 11:
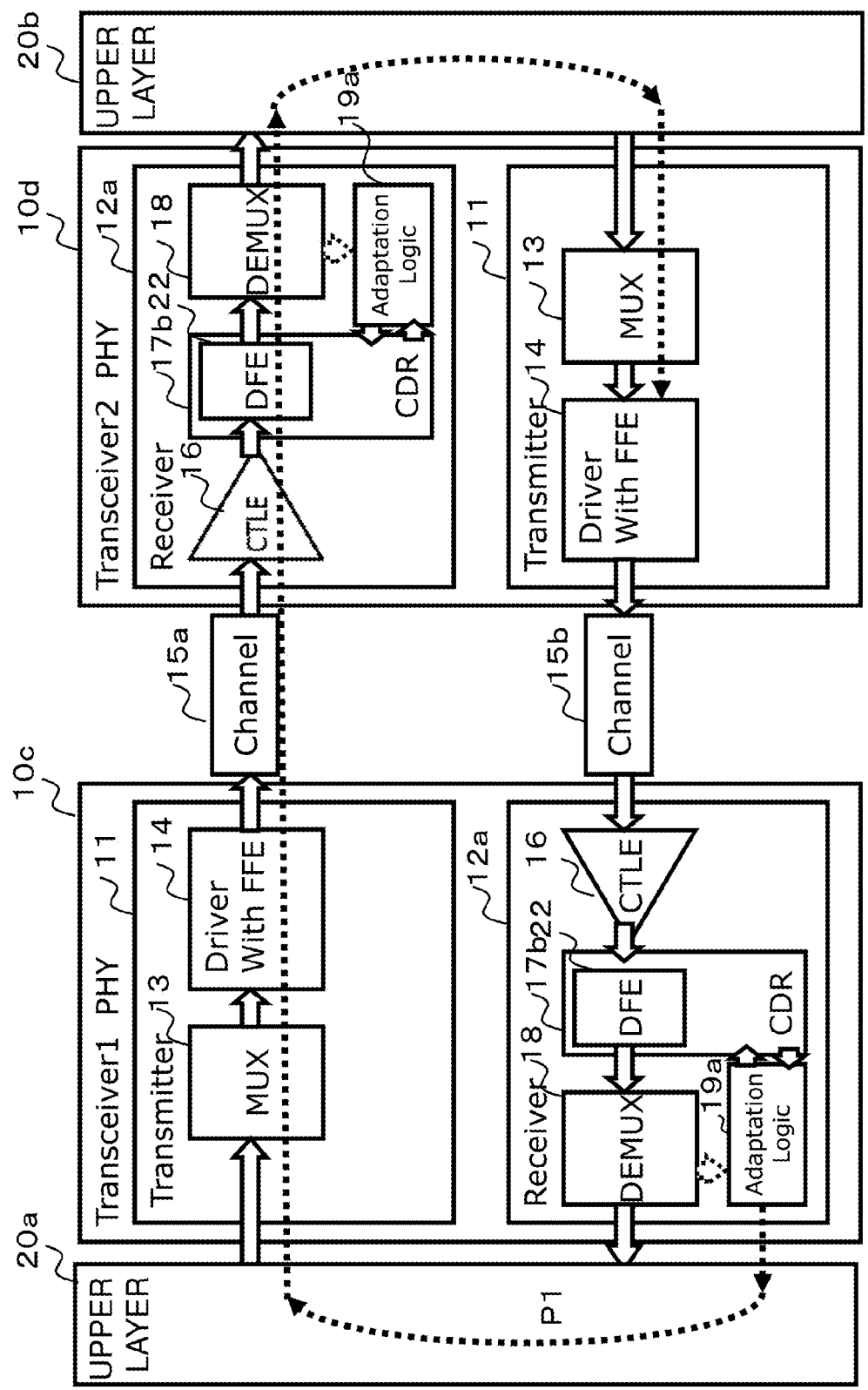
FIG. 11 is a block diagram illustrating a configuration of a transmission system according to a second exemplary embodiment.

FIG. 11 is a block diagram illustrating a configuration of a transmission system according to a second exemplary embodiment. In FIG. 11, the same symbols as those used in FIG. 1 denote the same or equivalent parts or components, and hence the corresponding description is dispensed with. In the transmission system of the present exemplary embodiment, a CDR 17b is provided in place of the CDR 17 of FIG. 1 in each of the receiver units 12a in the transceiver units 10c and 10d. The CDR17b includes a DFE 22 in addition to the CDR 17. A control unit 19a has also a function to control the DFE 22.

Figure 12:
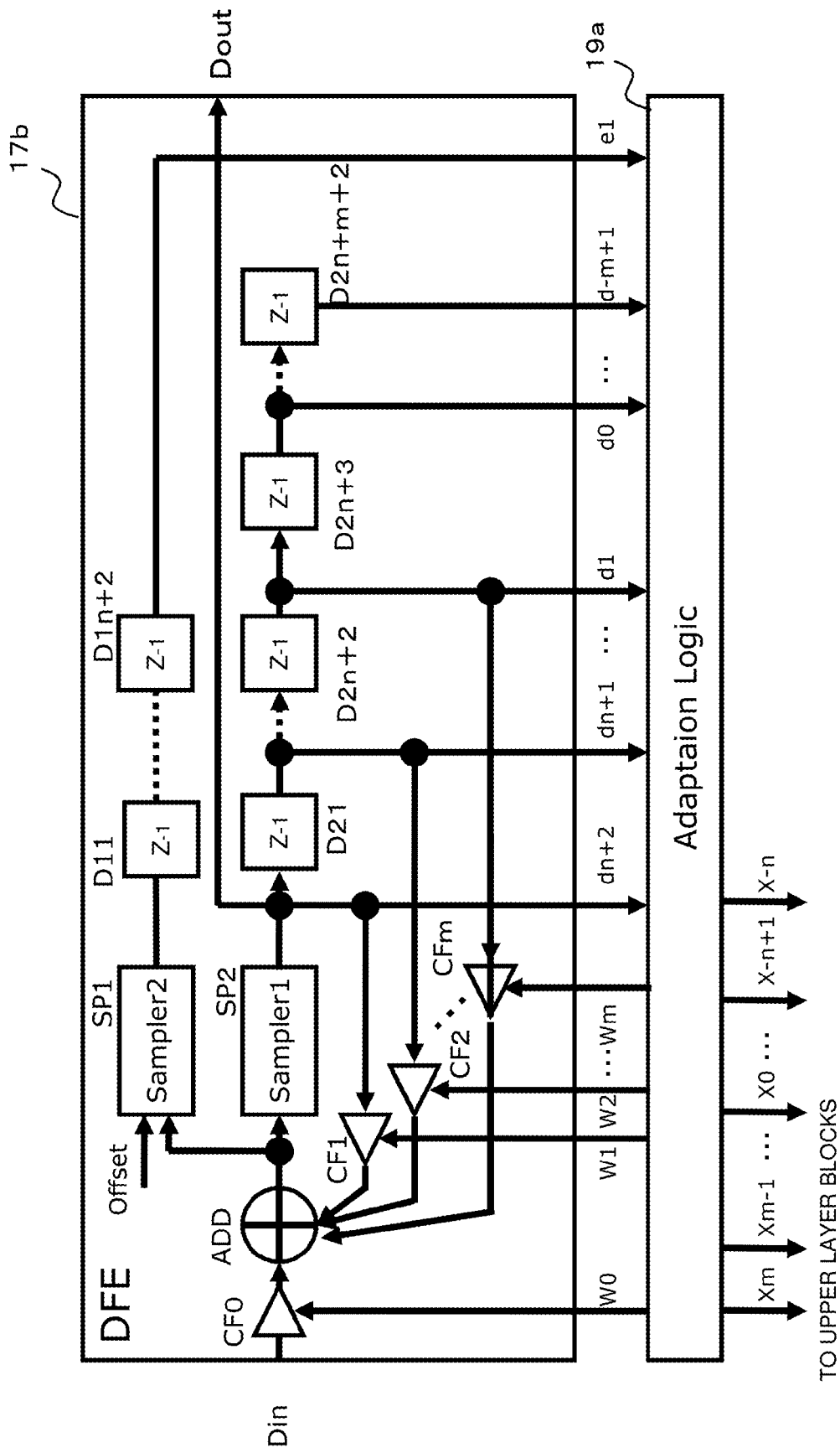
FIG. 12 is a block diagram illustrating a configuration of a CDR and a control unit according to the exemplary embodiment 2.

FIG. 12 is a block diagram illustrating a configuration of the CDR 17b and the control unit 19a of the exemplary embodiment 2. In FIG. 12, the function of clock extraction of the CDR 17b is not shown, such that only a part performing the function of data extraction and the DFE are shown. Here, the case where the FFE is made up by m+n+1 taps is shown, with the control unit 19a having the function to find the coefficients of the DFE 22 as well.

The CDR 17b includes sampling circuit SP1 and SP2, delay circuits D11 to D1n+1, D21 to D2n+m+2, coefficient units CF0 to CFm and an adder ADD.

The sampling circuit SP1 and SP2 and the unit delay circuits D11 to D1n+1, D21 to D2n+m+2 differ from FIG. 2 only in such a point that the unit delay circuits are represented in a generalized form with the use of letters n and m for the numbers of stages of the unit delay circuits. Hence, the corresponding description is dispensed with.

The coefficient unit CF0 multiplies the signal Din with a coefficient w0 output by the control unit 19a to output the result to the adder ADD. The coefficient units CF1 to CFm multiply respective input signals with coefficients w1 to wm output from the control unit 19a to output the results to the adder ADD. The adder ADD finds a sum total of outputs of the coefficient units CF0 to CFm to output the resulting sum to the sampling circuit SP1 and SP2.

The sampling circuit SP2, delay circuits D21 to D2n+m+2, coefficient units CF0 to CFm and the adder ADD, as an infinite response filter (IIR), constitute a decision feedback equalizer (DFE).

The following describes the function of coefficient calculations of the control unit 19a. FIGS. 13A and 13B and FIG.

13C and FIG. 13D illustrate methods of calculating the coefficients of the FFE and DFE. The function of FFE coefficient calculations, $$\Delta X[-n:m] = e[1] \times d[n+2:-m+1],$$

$$X[k]_n = X[k]_{n-1} + \Delta X[k] \times \text{Step}$$

as shown by Equations (1) and (2) in FIG. 13B, differs in no way from the method for calculations explained with reference to Equations (1-1) and (1-2) FIGS. 5B, since the present method for calculations is a generalization of the method for calculations of FIGS. 5A and 5B with m and n. The method of calculations, explained in comparison with the first exemplary embodiment, is used insofar as X[−1] and X[0] are concerned. The calculations of DFE coefficients, $$\Delta W[0:m] = e[1] \times d[1:-m+1] \qquad \text{EQUATION (1)}$$

$$W[k]n = W[k]n-1 + \Delta W[k] \times \text{Step} \qquad \text{EQUATION (2)}$$

As shown in FIGS. 13C and 13D, are performed in accordance with the principle of FFE coefficient calculations, that is, with the use of the known SS-LMS algorithm.

Figure 14:
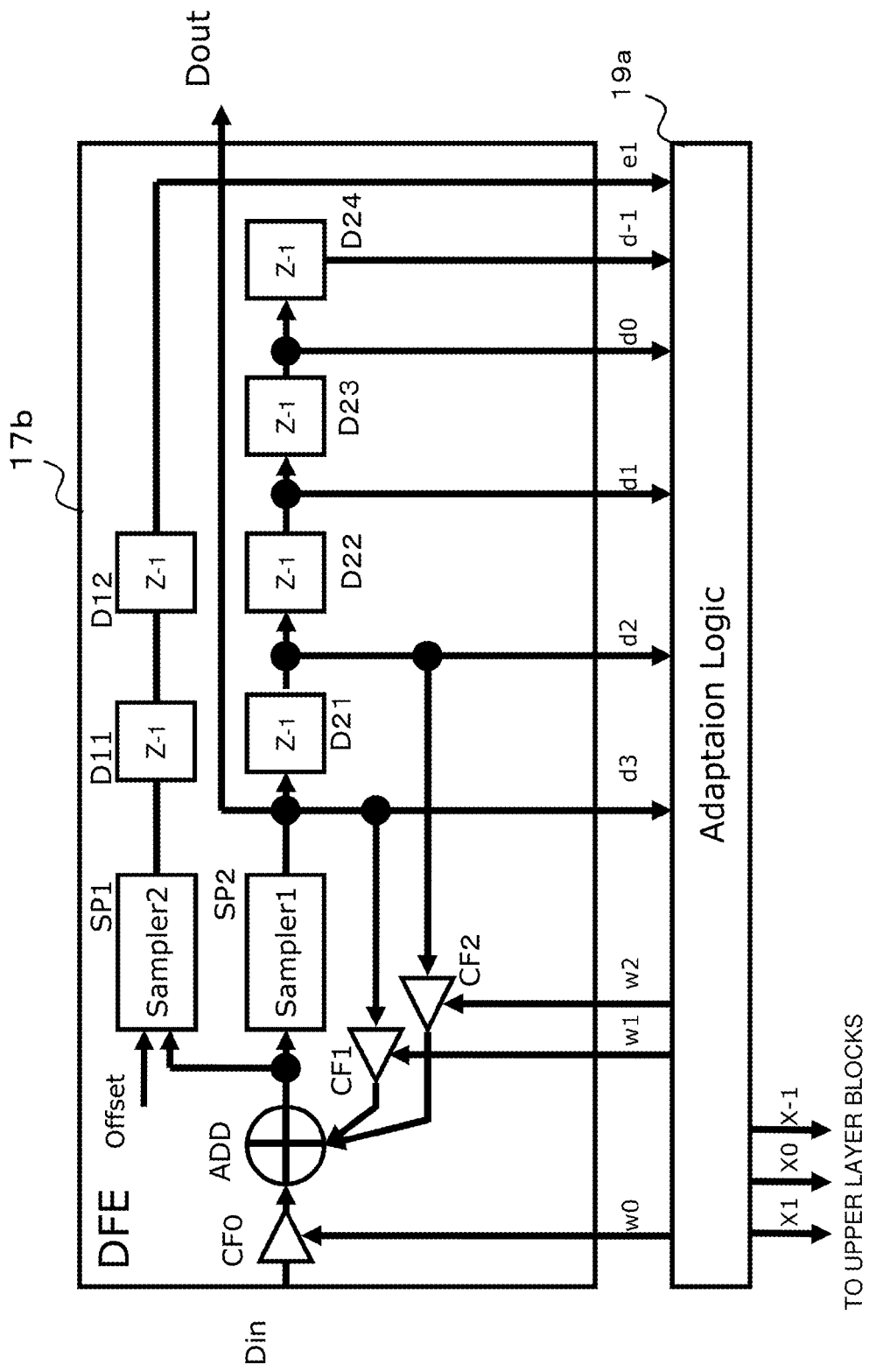
FIG. 14 is a block diagram illustrating a case where m=2 and n=1 in FIG. 12.

The case where m=2 and n=1, in FIG. 12, FIG. 13A and FIG. 13B is shown in FIG. 14, FIGS. 15A and 15B, and FIGS. 15C and 15D. Such configuration is desirable, in packaging respective components on a chip, because of ease of construction and improved performance in application to practical products, as will be explained subsequently. In FIG. 14, d3, d2, d1, d0 and e1 are supplied in parallel respectively from the unit delay circuits D21, D22, D23, D24 and D12 to the adaptation logic 10a, while W0 to W2 are supplied in parallel from the adaptation logic 10a to the coefficients units CF0, CF1 and CF2.

Figure 16A:
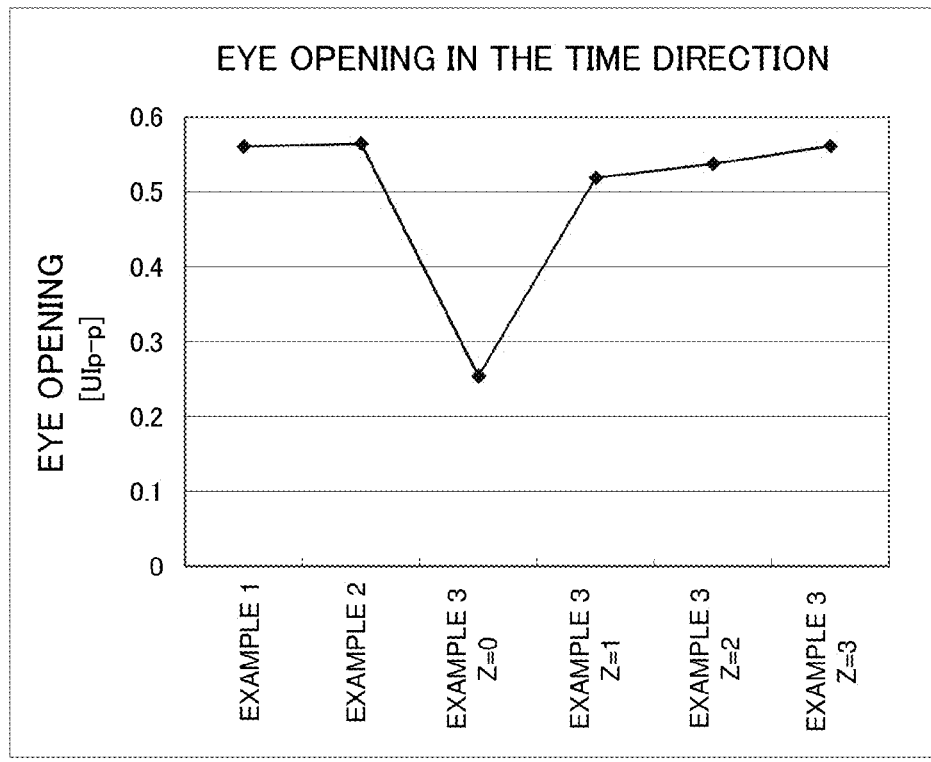
FIG. 16A and FIG. 16B are graphs showing eye openings in respective Examples for simulation.
Figure 16B:
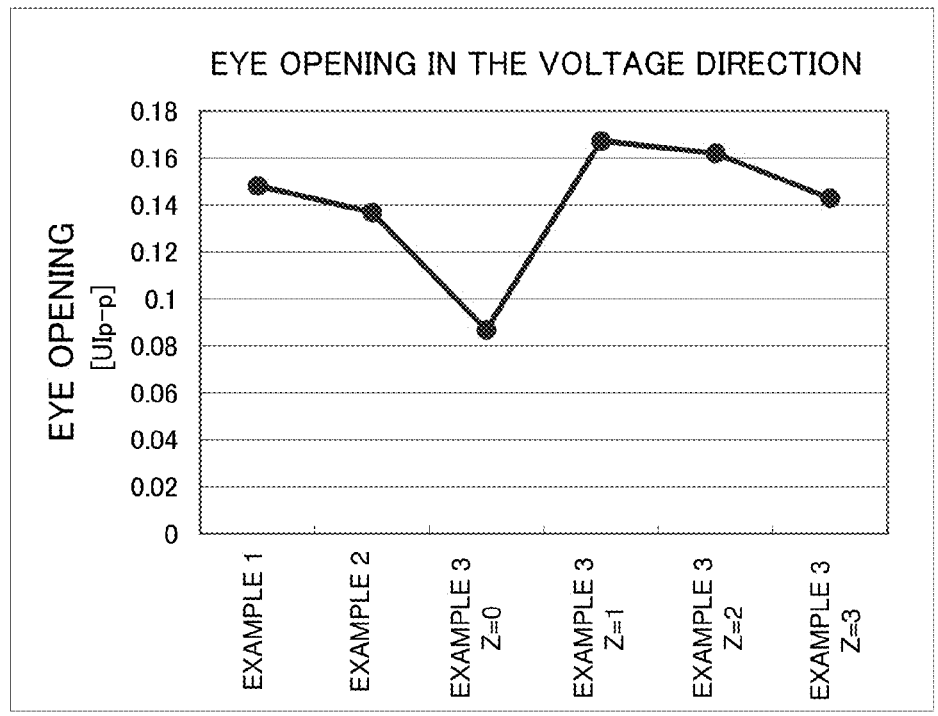
Figure 17:
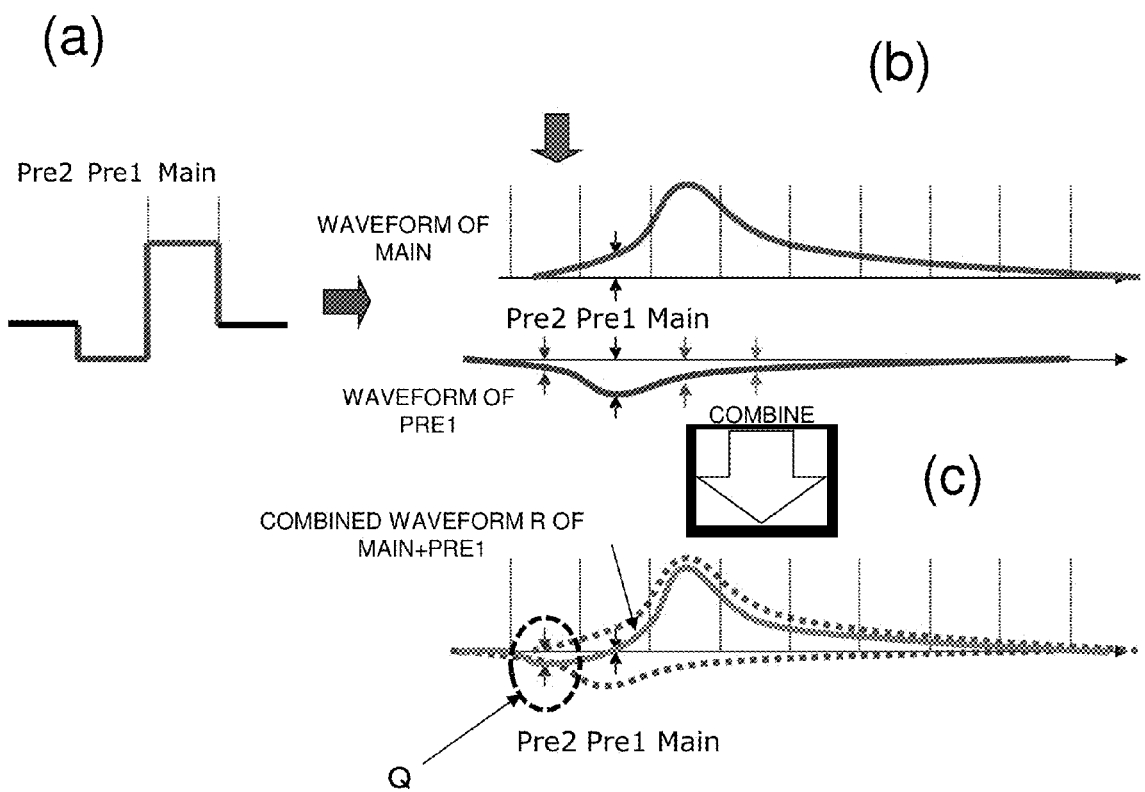
FIG. 17 illustrates signal waveforms for explaining the reason why a precursor of a coefficient of a related-art transmit-side equalizer becomes greater than an optimum value.

The following describes the performance of waveform equalization in the above described equalizer. FIG. 16A and FIG. 16B are graphs showing an eye opening in the respective exemplary embodiments by simulation. Specifically, FIG. 16A shows the eye opening along the time axis and FIG. 16B the eye opening along the amplitude direction.

The conditions for simulation are as follows:
loss on a transmission line: −35 dB at 5 GHz (Giga Herz) (board length, 30 inches);
transmission rate: 10 Gbps (Giga bits per second);
amplitude of the input waveform: High/Low=1/−1;
input pattern: PRBS12;
a DFE and a 14 dB CTLE for receiver-side equalization;
output k of a loop counter LCNT, k=64 and M=6.

It is noted that, in FIG. 16, Example 1 is based on the equations (1-1), (1-2), (1-3a) and (1-3b) and Example 2 on FIG. 8 (step S4). Example 3 is based on FIG. 9 (step S4a).

It may be seen from FIG. 16 that a sufficient eye opening may be obtained except the case of Z=0 corresponding to the related technique, and that, in particular, Z is preferably set to 1 to 2.

A method for testing an equalizer will now be explained. Here, a test signal is inserted at the position of a precursor Pre2 which in real implementation is not sent at the transmit-side. This precursor is a precursor directly previous to or one time ahead of the temporally most precedent precursor Pre1. As an example, the position of insertion of the test signal is before (or after) the channel (Channel) 15b of FIG. 1, and is at Din in FIG. 2 or FIG. 3. That is, such a test signal in which the value of the ISI at Pre2 is arbitrarily changed without changing the level of Pre1 or Main or changing the conditions on the transmission channel, using a waveform generation apparatus or the like, is transmitted. It is checked how a signal waveform at the receiver-side equalizer is changed by the ISI value at the precursor Pre2. More specifically, such a test signal that will give a preset positive or negative value of ISI at Pre2 is inserted and transmitted to check to see how the signal waveform converges at the position of Pre1 in a combined waveform of Pre1+Main obtained at the receiver-side equalizer. It is noted that the combined waveform of Pre1+Main observed is an output of the channel 15b of FIG. 1 (Rx input side) or an input to the CTLE 16, as an example. Specifically, the flow of control of transmit-side equalizer coefficients (FFE coefficients) is as follows: Referring to FIG. 1, as an example, a test signal is inserted at a position ahead of the cannel 15b and processed by the adaptation logic 19 of the receiver unit 12 of the transceiver unit 10a. The result of the processing is sent via the upper layer section 20a to the driver 14 (Driver with FFE) of the transmitter unit 11 of the transceiver unit 10a to set FFE coefficients. The resulting output signal is sent via the CLTE 16, the CDR 17 and the demultiplexer (DEMUX) 18 of the receiver unit 12 of the transceiver unit 10b, via the upper layer section 20b and via the multiplexer (MUX) 13 of the transmitter unit 11 of the transceiver unit 10b so as to be output from the driver 14 (Driver with FFE). An output of the driver 14 is supplied to the channel 15b, whose output, a combined waveform of Pre1+Main, is observed. The waveform of Main and that of Pre1 may be observed as transmission waveforms in the driver 14 (Driver with FFE) of the transmitter unit 11 of the transceiver unit 10a, as an example. Instead of observing the combined waveform of Pre1+Main, as in the above described exemplary embodiment, a packet of an output signal of the driver 14 of the transmitter unit 11 of the transceiver unit 10a of FIG. 1, as an example, may be decoded. By so doing, it is possible to monitor how the result of the processing by the adaptation logic 19 of the receiver unit 12 of the transceiver unit 10a is about to control the FFE of the driver 14 (Driver with FFE) of the transmitter unit 11 of the transceiver unit 10b. The conditions for simulation are the same as those described above.

FIG. 18 illustrates schematically signal waveforms (a) to (e) at various parts obtained by the test conducted for the above Examples 1 and 2. It is seen from FIG. 18 that when the ISI value at Pre2 is positive, as indicated by R1 in the transmission waveform (b), the coefficients converge in such a manner that, due to the optimized equalizer coefficients, the ISI value at Pre1 is equal to 0, as indicated by S1 in the Pre1+Main combined waveform (c). It may also be seen from FIG. 18 that when the ISI value at Pre2 is negative, as indicated by R2 in the transmission waveform (d), the coefficients converge in such a manner that, due to the optimized equalizer coefficients, the ISI value at Pre1 is positive, as indicated by S2 in the Pre1+Main combined waveform (e).

Figure 19:
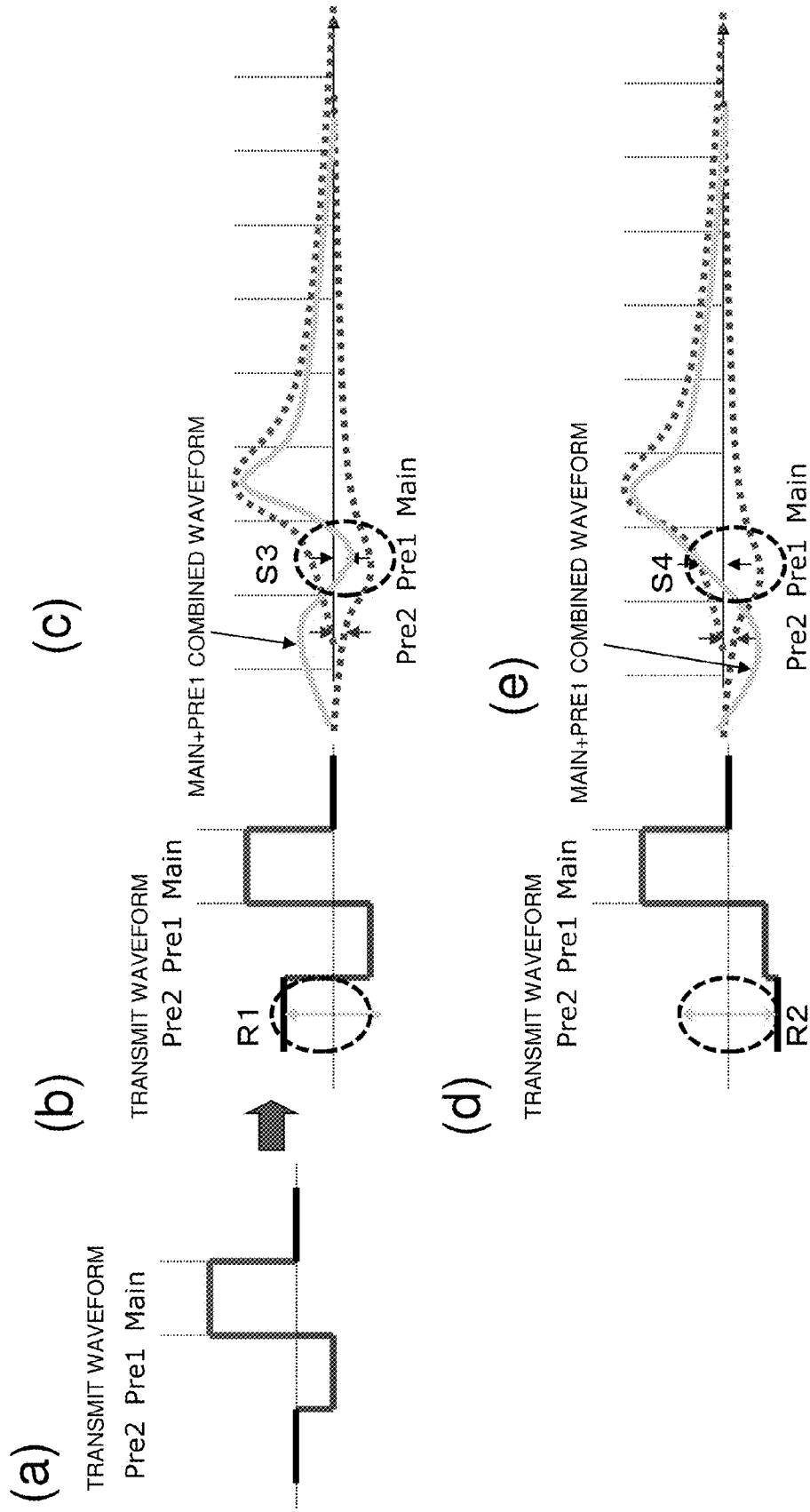
FIG. 19 illustrates signal waveforms at various parts in a test method conducted on Example 3 for simulation.

FIG. 19 illustrates schematically signal waveforms (a) to (e) at various parts obtained by the test method for simulation, conducted for Example 3, where, however, Z=1. It is seen from FIG. 19 that when the ISI value at Pre2 is positive, as indicated by R1 in the transmission waveform (b), the coefficients converge in such a manner that, due to the optimized equalizer coefficients, the ISI value at Pre1 is negative, as indicated by S3 in the Pre1+Main combined waveform (c). It is also seen from FIG. 19 that when the ISI value at Pre2 is negative, as indicated by R2 in the transmission waveform (d), the coefficients converge in such a manner that, due to the optimized equalizer coefficients, the ISI value at Pre1 is positive, as indicated by S4 in the Pre1+Main combined waveform (e). It may be observed that the ISI value of Pre2 of the test signal is at least one of a positive value and a negative value and that the signal at the position of the temporally most precedent precursor Pre1 (ISI value) converges to other than zero.

Figure 20:
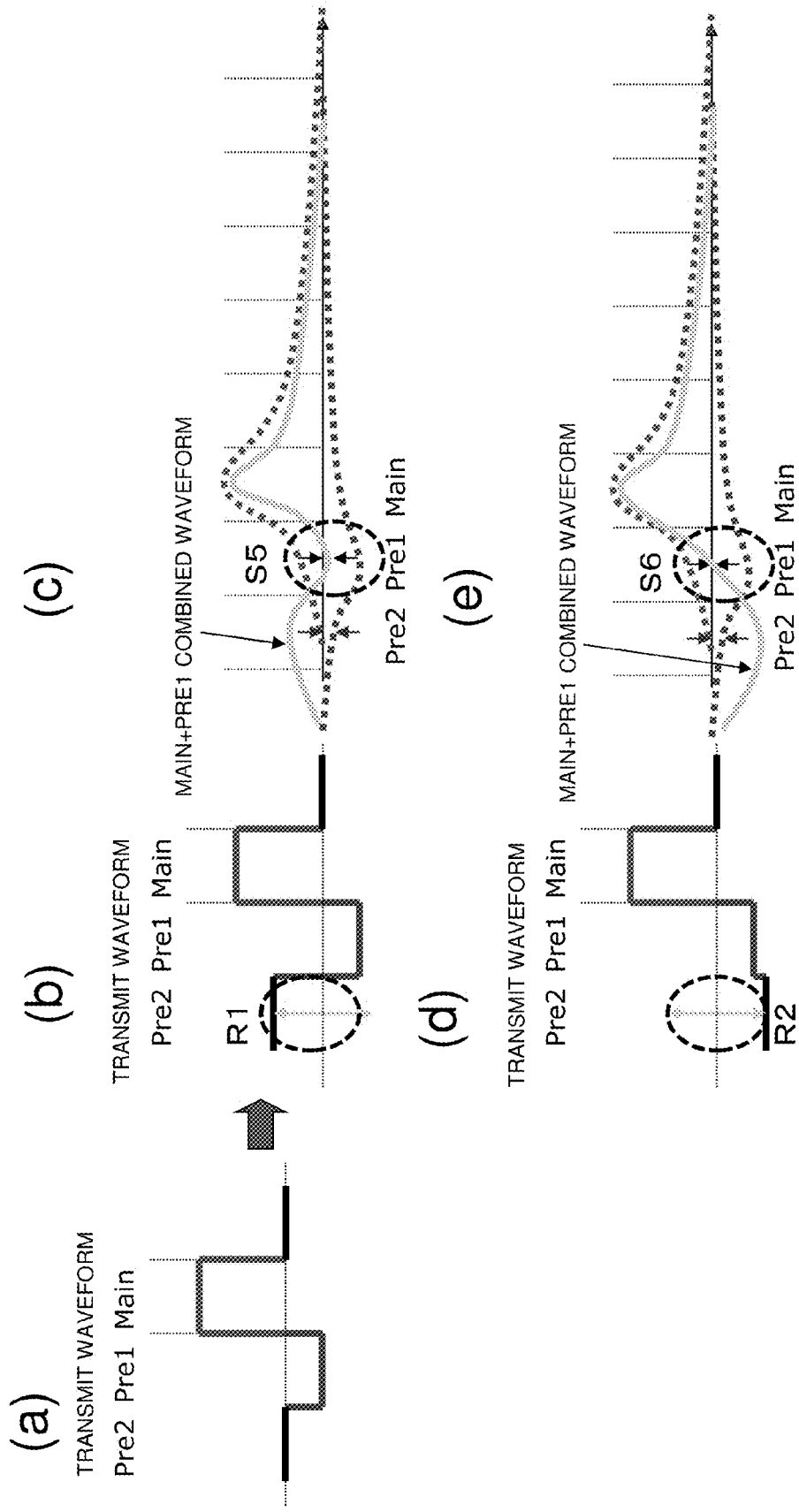
FIG. 20 illustrates signal waveforms at various parts in a test method conducted on a conventional technique for simulation.

FIG. 20 illustrates schematically signal waveforms (a) to (e) at various parts for the method of testing by simulation where, for Example 3, Z=0. Specifically, FIG. 20 illustrates signal waveforms (a) to (e) of various parts for a test method in which the related technique is used. It is seen from FIG. 20 that the coefficients converge so that, owing to the optimized equalizer coefficients, the ISI value at Pre1 will be zero, regardless of whether the ISI value at Pre2 is positive, as indicated by R1 in the transmission signal (b), or negative, as indicated by R2 in the transmission waveform (d). This may be seen at S5 and S6 in the Pre1+Main combined waveforms (c) and (e) of FIG. 20.

By inserting and transmitting a test signal to render the ISI value at Pre2 positive or negative, and by observing how the signal waveform at the receiver-side equalizer is changed, as described above, it is possible to decide whether or not the technique of the present application is being used. More specifically, in the receiver-side equalizer, if the ISI at Pre1 converges to 0 regardless of whether the test signal is positive or negative, it may be judged that the conventional technique is being used. Conversely, if the ISI at Pre1 converges to other than zero in the receiver-side equalizer, for at least one of the positive signal or the negative test signal, the probability is high that the technique according to the present application is being used.

The above described equalizer may be suitably used for a product carrying thereon a Serdes (Serializer/Deserializer) conforming to standards stipulating that the equalizer loaded on a transmit-side is to be optimized, for example, PCI (Peripheral Component Interconnect) gen3.

Specifically, in the PCIgen3, coefficients of a decision feedback equalizer (DFE) loaded on a receiver-side is to be optimized from the receiver-side, and that the coefficients on a transmit-side equalizer are also to be optimized by control from the receiver-side. The standard of the PCIgen3 provides a 3-tap transmit-side FFE having three taps, consisting of a pre-cursor, a main cursor and a post cursor. The role of the precursor that may not be corrected by the receiver-side DFE is crucial. The above described equalizer operates effectively for such precursor adjustment.

The present invention has been described above in detail with reference to its preferred exemplary embodiments. It should be noticed however that the present invention is not limited to the above exemplary embodiments and may be changed in many ways without departing from its scope.

The disclosures of the above mentioned Patent Publication and so forth are to be incorporated herein by reference. The particular Examples may be modified or adjusted within the gamut of the entire disclosure of the present invention, inclusive of claims, based on the fundamental technical concept of the invention. Moreover, a variety of combinations or selection of elements disclosed inclusive of the elements of claims, Examples and the drawings may be made within the concept of the claims. The present invention may encompass a wide variety of modifications or corrections that may occur to those skilled in the art in accordance with the entire disclosure of the present invention, inclusive of claims and the technical concept of the invention.

The matters supplemented or corrected in the present application are to be handled with the filing date of the present application as reference. However, the matters disclosed as being the basis for assertion of Convention rights are not affected by such supplemented or corrected matters and should be taken to be the matters stated on the date of assertion of the Convention rights to benefit in the same way from the Convention rights. The matters disclosed as being the basis of the assertion of the Convention rights are to be read as being valid as such as if the matters supplemented or corrected in the present application were not so supplemented or corrected.

What is claimed is:

1. An equalizer comprising:
   first and second discrimination circuits configured to receive, in common, an input signal corresponding to a signal output from a transmit-side equalizer,
   the first discrimination circuit configured to perform binarization of the input signal using a first threshold value to produce a first binary signal, in unit time;
   the second discrimination circuit configured to perform binarization of the input signal using a second threshold value to produce a second binary signal, in the unit time, and configured to output a second output signal, in the unit time;
   a first delay circuit configured to receive the first binary signal output from the first discrimination circuit to delay the first binary signal and configured to output a first output signal, the first delay circuit comprising an N-number of stages of unit delay circuits connected in cascade, N being an integer greater than or equal to 2, each of the unit delay circuits configured to operate in the unit time; and
   a control unit configured to receive the first and second output signals to perform control so that a coefficient of a temporally most precedent precursor in the transmit-side equalizer is not increased, when the first output signal and the second output signal have polarities not coincident with each other.

2. The equalizer according to claim 1, further comprising a second delay circuit configured to receive the second binary signal output from the second discrimination circuit to delay the second binary signal, the second delay circuit comprising not less than an (N+1)-number of stages of unit delay circuits connected in cascade, each of the unit delay circuits configured to operate in the unit time, wherein the control unit is configured to further receive, as a third output signal, an output signal output from a first stage unit delay circuit of the second delay circuit,
   the control unit performing control so that, when the polarities of the first and second output signals are coincident with each other, the coefficient of the temporally most precedent precursor is respectively increased or decreased, based on whether the polarities of the first and third output signals are coincident or non-coincident with each other.

3. The equalizer according to claim 2, wherein the control unit comprises:
   a first counter configured to count in one direction, in unit time, when the polarities of the first and second output signals are coincident with each other, and to count in a direction opposite to the one direction, in unit time, when the polarities of the first and second output signals are not coincident with each other,
   the control unit performing control so that, when a value of the first counter is less than a first value, the coefficient of the temporally most precedent precursor is not increased.

4. The equalizer according to claim 3, wherein the control unit further comprises:
   a second counter configured to count in one direction, in unit time, when the polarities of the first and third output signals are coincident with each other, and to count in a direction opposite to the one direction, in unit time, when the polarities of the first and third output signals are not coincident with each other, the control unit performing control so that, when the value of the first counter is not less than the first value, the coefficient of the temporally most precedent precursor is
(a) increased,
(b) decreased, or
(c) unchanged, respectively, depending on whether the value of the second counter is
(a) greater than a second value,
(b) less than a third value, or
(c) not greater than the second value and not less than the third value.

5. An equalizer comprising:
first and second discrimination circuits configured to receive, in common, an input signal corresponding to a signal output from a transmit-side equalizer,
the first discrimination circuit configured to perform binarization of the input signal using a first threshold value to produce a first binary signal, in unit time,
the second discrimination circuit configured to perform binarization of the input signal using a second threshold value to produce a second binary signal, in the unit time, and configured to output a second output signal, in the unit time;
a first delay circuit configured to receive the first binary signal output from the first discrimination circuit to delay the first binary signal and configured to output a first output signal, the first delay circuit comprising an N-number of stages of unit delay circuits connected in cascade, N being an integer greater than or equal to 2, each of the unit delay circuits configured to operate in the unit time;
a second delay circuit configured to receive the second binary signal output from the second discrimination circuit to delay the second binary signal and configured to output a third output signal from a first stage unit delay circuit of the second delay circuit, the second delay circuit comprising not less than an (N+1)-number of stages of unit delay circuits connected in cascade, each of the unit delay circuits configured to operate in the unit time; and
a control unit configured to receive the first, second, and third output signals respectively, the control unit performing control so that a coefficient of the temporally most precedent precursor in the transmit-side equalizer is
(a) increased,
(b) decreased or
(c) unchanged, respectively, depending on whether $t1+t2 \cdot Z$ is
(a) greater than a second value,
(b) less than a third value, or
(c) not greater than the second value and not less than the third value, where, during a preset time period which is an integer number times of the unit time,
wherein t1 is the number of times that polarities of the first and third signals are coincident with each other, less the number of times that the polarities of the first and third signals are not coincident with each other, and
wherein t2 is the number of times that the polarities of the first and second signals are coincident with each other, less the number of times that the polarities of the first and second signals are not coincident with each other, and
wherein Z is a positive real number.

6. The equalizer according to claim 5, wherein the second value is M, M being a positive real number, and the third value is −M.

7. The equalizer according to claim 5, wherein Z is set to 1 to 2.

8. The equalizer according to claim 6, wherein the control unit is configured to control so as not to increase the coefficient of the precursor when t2 is less than −M.

9. The equalizer according to claim 1, wherein the control unit is configured to control so that a sum total of widths of changes of settable equalization coefficients of the transmit-side equalizer is to be kept constant.

10. The equalizer according to claim 2, further comprising
a serial-to-parallel conversion circuit configured to receive the first and second binary signals output from the first and second discrimination circuits, respectively, the serial-to-parallel conversion circuit converting the first and second binary signals into a parallel signal to hold the resulting parallel signal, the serial-to-parallel conversion circuit supplying the held parallel signal to the control unit at an interval of N unit times,
the control unit controlling the coefficient of the temporally most precedent precursor every N unit times.

11. The equalizer according to claim 2, wherein the control unit further comprises:
a weighted addition circuit configured to perform weighted addition of a part or all of output signals of the unit delay circuits of the second delay circuit to obtain a sum, and further to perform weighted addition of a signal output from the transmit-side equalizer and the sum,
the first and second discrimination circuits receiving an output signal of the weighted addition circuit, as the input signal.

12. A semiconductor device comprising the equalizer according to claim 1.

13. A method for testing an equalizer, the equalizer comprising:
first and second discrimination circuits configured to receive in common an input signal corresponding to a signal output from a transmit-side equalizer,
the first discrimination circuit configured to perform binarization of the input signal using a first threshold value to produce a first binary signal, in unit time,
the second discrimination circuit configured to perform binarization of the input signal using a second threshold value to produce a second binary signal, in unit time and configured to output a second output signal, in the unit time;
a first delay circuit configured to receive the first binary signal output from the first discrimination circuit to delay the first binary signal and configured to output a first output signal, the first delay circuit comprising an N-number of stages of unit delay circuits connected in cascade, N being an integer greater than or equal to 2, each of the unit delay circuits configured to operate in unit time; and
a control unit configured to receive the first and second output signals to perform control so that a coefficient of a temporally most precedent precursor in the transmit-side equalizer is not increased, when the first output signal and the second output signal have polarities not coincident with each other,
the method comprising:
inserting a test signal to a position of a precursor preceding the temporally most precedent precursor in the transmit-side equalizer further by one unit time; and
outputting the test signal at the transmit-side equalizer.

14. The method according to claim 13, comprising
observing a signal at a position of the temporally most precedent precursor.

15. The method according to claim 14, comprising
using the test signal that is at least one of the positive and negative signals; and
checking that a signal at the position of the temporally most precedent precursor converges to other than zero.

* * * * *